Jan. 8, 1963 W. C. BELK 3,072,207

ARTICLE HANDLING APPARATUS

Filed June 17, 1957 16 Sheets-Sheet 1

INVENTOR
WILBER C. BELK

BY Hans G. Hoffmeister
ATTORNEY

Jan. 8, 1963

W. C. BELK 3,072,207

ARTICLE HANDLING APPARATUS

Filed June 17, 1957

16 Sheets-Sheet 2

INVENTOR
WILBER C. BELK

BY Hans G. Hoffmeister
ATTORNEY

Jan. 8, 1963

W. C. BELK 3,072,207

ARTICLE HANDLING APPARATUS

Filed June 17, 1957

16 Sheets-Sheet 3

INVENTOR
WILBER C. BELK

BY Hans G. Hoffmeister

ATTORNEY

Jan. 8, 1963 W. C. BELK 3,072,207

ARTICLE HANDLING APPARATUS

Filed June 17, 1957 16 Sheets-Sheet 4

INVENTOR
WILBER C. BELK

BY Hans G. Hoffmeister

ATTORNEY

Jan. 8, 1963 W. C. BELK 3,072,207

ARTICLE HANDLING APPARATUS

Filed June 17, 1957

16 Sheets-Sheet 5

INVENTOR
WILBER C. BELK

BY Hans G. Hoffmeister

ATTORNEY

Jan. 8, 1963

W. C. BELK 3,072,207

ARTICLE HANDLING APPARATUS

Filed June 17, 1957

16 Sheets-Sheet 6

INVENTOR
WILBER C. BELK

BY Hans G. Hoffmeister
ATTORNEY

Jan. 8, 1963 W. C. BELK 3,072,207

ARTICLE HANDLING APPARATUS

Filed June 17, 1957 16 Sheets-Sheet 7

INVENTOR
WILBER C. BELK

BY Hans G. Hoffmeister
ATTORNEY

INVENTOR
WILBER C. BELK

BY Hans G. Hoffmeister
ATTORNEY

Jan. 8, 1963 W. C. BELK 3,072,207

ARTICLE HANDLING APPARATUS

Filed June 17, 1957 16 Sheets-Sheet 9

INVENTOR
WILBER C. BELK

BY Hans G. Hoffmeister.
ATTORNEY

Jan. 8, 1963

W. C. BELK 3,072,207

ARTICLE HANDLING APPARATUS

Filed June 17, 1957

16 Sheets-Sheet 10

INVENTOR
WILBER C. BELK

BY Hans G. Hoffmeister
ATTORNEY

Jan. 8, 1963 W. C. BELK 3,072,207

ARTICLE HANDLING APPARATUS

Filed June 17, 1957 16 Sheets-Sheet 11

INVENTOR
WILBER C. BELK

BY Hans G. Hoffmeister
ATTORNEY

Jan. 8, 1963

W. C. BELK 3,072,207

ARTICLE HANDLING APPARATUS

Filed June 17, 1957

16 Sheets-Sheet 12

INVENTOR
WILBER C. BELK

BY Hans G. Hoffmeister

ATTORNEY

ARTICLE HANDLING APPARATUS

Filed June 17, 1957

INVENTOR
WILBER C. BELK

BY Hans G. Hoffmeister
ATTORNEY

INVENTOR
WILBER C. BELK

BY Hans G. Hoffmeister
ATTORNEY

INVENTOR
WILBER C. BELK
BY Hans G. Hoffmeister
ATTORNEY

INVENTOR
WILBER C. BELK
BY Hans G. Hoffmeister
ATTORNEY

United States Patent Office 3,072,207

Patented Jan. 8, 1963

3,072,207
ARTICLE HANDLING APPARATUS
Wilber C. Belk, Lakeland, Fla., assignor to FMC Corporation, a corporation of Delaware
Filed June 17, 1957, Ser. No. 666,018
10 Claims. (Cl. 177—71)

This invention pertains to apparatus for handling articles and more particularly relates to a machine for weighing and bagging farm produce.

An object of the present invention is to provide an improved apparatus for handling bulk farm produce and for packaging the same in bags in small quantities of substantially uniform weight.

Another object of the present bagger is to provide a novel conveyor for transporting articles in a weighing and bagging machine.

Another object is to provide in a bag filling machine an improved device for discharging articles from a conveyor belt.

Another object is to provide an improved means for varying the capacity of the pockets of a pocket-type conveyor belt.

Another object is to provide in a bagger an improved article receiving means employed in weighing the articles and filling the same into bags.

Another object is to provide a simple and effective means, operating in conjunction with a conveyor, for vibrating articles in a storage bin of an article handling machine.

These and other objects and advantages will become apparent from the following description taken in connection with the accompanying drawings, in which.

Figure 1:
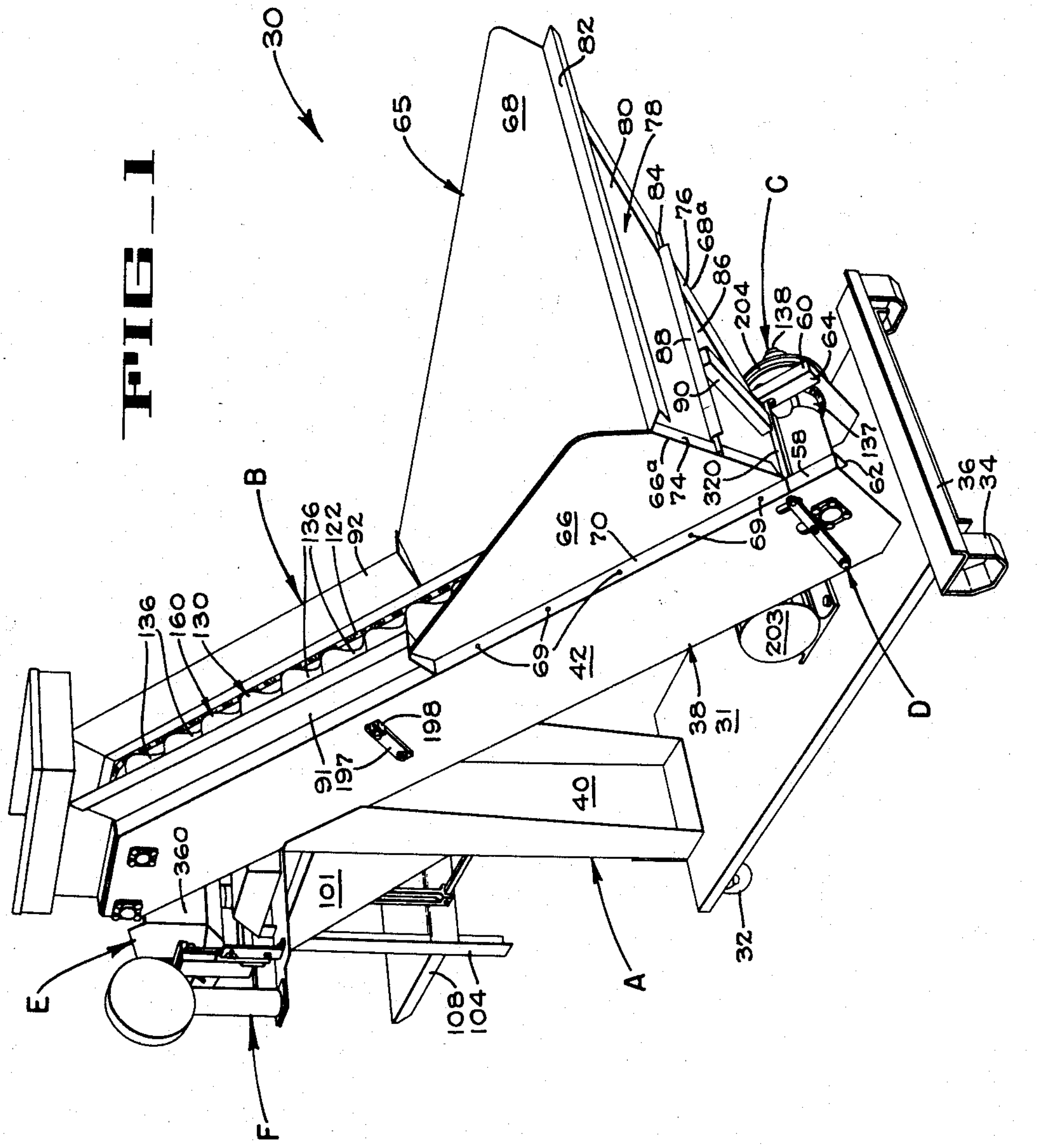
FIG. 1 is a perspective of the present bag filling apparatus looking at the feed end and at one side of the machine.
Figures 2, 3:
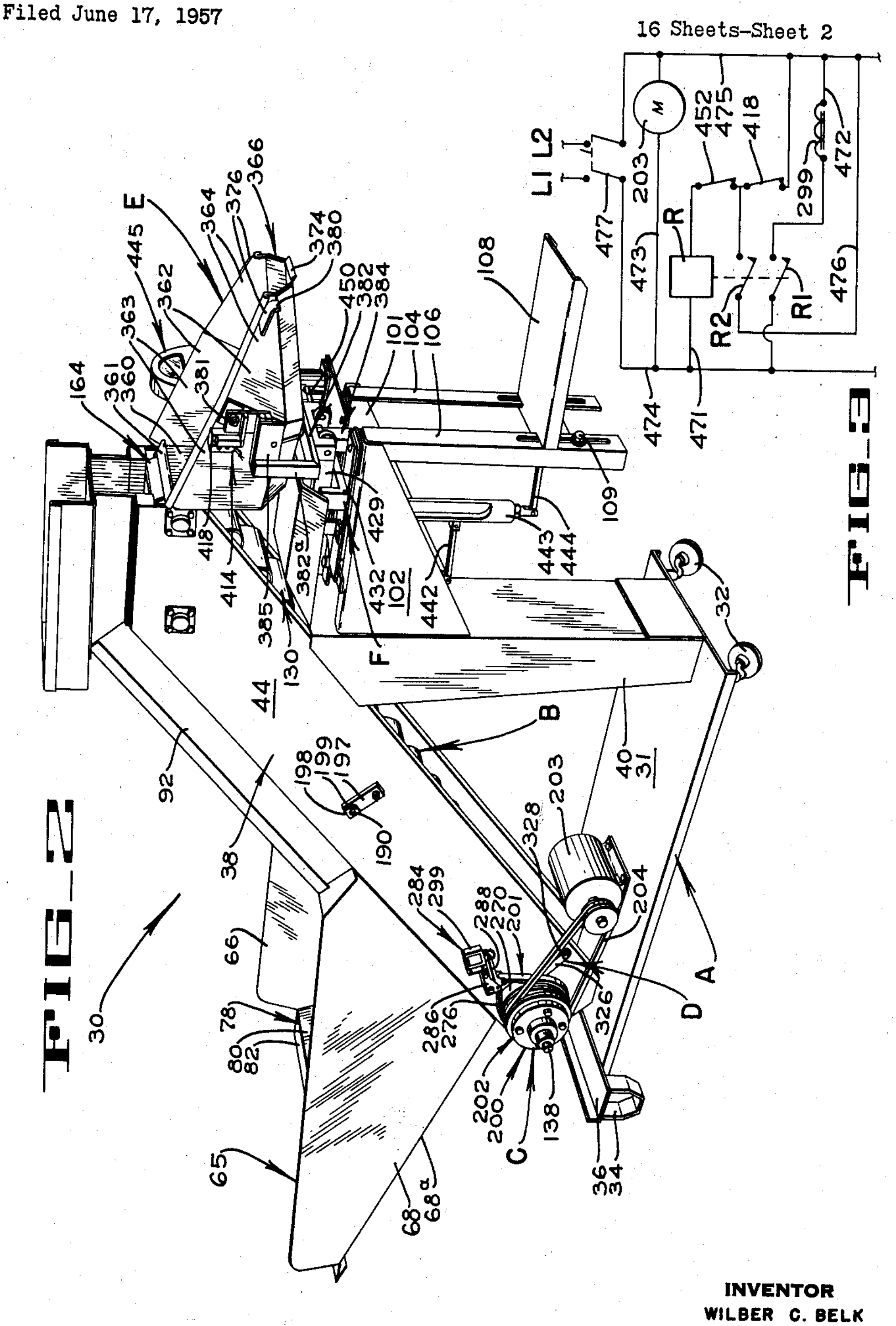
FIG. 2 is another perspective looking at the discharge end of the machine and at the side opposite to that shown in FIG. 1.
FIG. 3 is a diagram of the electrical control system of the bag filling machine shown in FIGS. 1 and 2.

One embodiment 30 of the bag filling machine of the present invention is illustrated in FIGURES 1 and 2 and comprises a support frame A having an endless chain type conveyor B arranged to take articles such as apples, potatoes, and the like, from a supply bin, move them upwardly, and deliver them to a hopper E that is operatively associated with a weighing machine F. After being weighed, the articles are discharged from the hopper into a bag that is positioned at the outlet of the hopper. A drive mechanism C is mounted on the frame and is operatively connected in driving relation with the conveyor B. An agitator mechanism D is arranged to vibrate a wall of the supply bin to prevent channelling and bridging of the articles in the bin.

The support frame A comprises a flat, generally elongated plate 31 (FIG. 1), which forms the base for the bagger and is supported upon a floor (not shown) by two caster wheels 32 and two short runners or skids 34. The skids are affixed to the opposite ends of an angle member 36 which is securely attached to the front end of the plate 31 and projects outwardly of the side edges of the plate so as to dispose the skids laterally of the plate. The widely spaced skids give stability to the bagger even though produce contained in the supply bin may be located generally toward one side thereof. The two caster wheels 32 are attached to the rear end of the plate 31 in any convenient manner and give mobility to the bagger.

Adjacent the front end of the base plate 31 is attached one end of an elongated, generally rectangular housing 38 in which the conveyor B is operably disposed. From its point of attachment to the base plate 31 the conveyor housing 38 is inclined upwardly and rearwardly. A single leg 40, fabricated of sheet metal and having the form of a channel member, supports the rear, upper end of the conveyor housing 38. The leg 40 may be welded or otherwise affixed to the conveyor housing 38 and to the adjacent end of the base plate 31.

The conveyor housing 38 (FIGS. 4 and 10) comprises two spaced side channels 42 and 44 which are held in uniformly spaced relation by a plurality of transverse channel members 46 (FIG. 10) as well as by the base plate 31 and the rear support leg 40. The spacer members 46 not only hold the conveyor housing side channels 42 and 44 in fixed spaced relation but also provide support for a track assembly 48 which guides the chains of the conveyor B. The track assembly 48 comprises two parallel rails 50 and 52 (FIG. 10) that are in the form of channels and are mounted in an inclined position upon the spacers 46 so as to lie adjacent the inner surfaces of the side walls 42 and 44, respectively, and in parallel relation thereto. In addition to the inclined rails 50 and 52, the track assembly 48 includes two short horizontal rails 54 and 56 (FIG. 8) which are rigidly attached to the uppermost spacer channel 46. The upwardly inclined rail 50 and the short rail 54, both of which are in the form of channel bars, are in longitudinal alignment and the upper flanges 57 of these bars form a support track for one side of the endless chain of the conveyor B. Similarly the upper flanges of the aligned rails 52 and 56 provide a support track for the other side of the chain. It will be noted (FIG. 4) that the support track formed by rails 50 and 54 is not continuous since the forward end of the horizontal rail 54 is spaced a short distance from the rear end of the inclined rail 50. The tracks formed by aligned rails 52 and 56 have a similar gap.

The side channels 42 and 44 of the conveyor housing have upper flanges 58 and 60, respectively (FIG. 10), which overlie the inclined portions of the track assembly 48, and flanges 58*a* and 60*a* (FIG. 8) that overlie the upper horizontal portions of the track assembly. Vertical flanges 62 and 64 project downwardly from the inner edges of the flanges 58, 58*a*, 60 and 60*a* toward the upper surface of the conveyor support tracks.

A storage bin 65 (FIGS. 1 and 2) is mounted at the forward end of the conveyor housing. This bin comprises two spaced side panels 66 and 68 which are of generally triangular configuration. The bin is mounted on the conveyor housing by bolts 69 which extend through out-turned flanges 70 formed on the lower edges of the two side panels and through the upper flanges of the side channels 42 and 44. The side panels 66 and 68 of the bin are inclined outwardly in opposite directions so that the upper portions of their front edges are spaced farther apart than the lower portions of the front edges.

It will be noted (FIGS. 1 and 4) that the front edges 66*a* and 68*a* of the bin side panels 66 and 68 are angled upwardly and forwardly from their point of attachment to the conveyor housing 38. These panel edges are bent inwardly of the bin providing elongated lips 74 and 76, respectively, on the panels 66 and 68. An end wall 78, extending transversely of the bagger 30 across the front of the bin 65, is disposed against the inside surface of the lips 74 and 76 interiorly of the bin. This wall comprises an upper fixed portion 80 which is attached to the oppositely disposed lips 74 and 76 and has a ledge 82 formed along its upper edge. Spaced from the wall portion 80, immediately therebelow, is a rod 84 (FIG. 1), that extends horizontally across the bin 65. The rod 84 is affixed to the lips 74 and 76 exteriorly thereof at the front of the bin and serves to support and pivotally moun a plate 86 that comprises the lower portion of the wall 78. The plate 86 is located at the side of the lips 74 and 76, interiorly of the bin and extends thereacross between the panels 66 and 68. The top edge of the plate 86 is forwardly hooked as at 88 (FIG. 4) in order to pivotally support the plate upon the rod 84 for swinging movement of the plate inwardly of the bin. A vertically extending stiffener channel 90 is welded or otherwise secured to the outer face of the lower wall plate 86 centrally thereof. Guide plates or fenders 91 and 92 (FIGS. 1 and 2) are mounted on the upper flanges of the sides of the conveyor housing 38 to form upper continuations of the side panels of the bin.

If desired, an auxiliary plate 93 (FIG. 5) may be positioned in the bin. This plate has a panel-like body portion 94, which forms the bottom wall of the modified hopper, an upper flange 95 that overlies a ledge 96 of a front wall 97 and a plurality of rods 98 (one only being shown) which are secured at one end to the undersurface of the body portion 94 and extend downwardly into abutting contact with a pivotal plate 99 at the lower end of the hopper forward wall 97. A flexible member 100 which is secured across the lower end of the body portion 94, overlies the associated conveyor belt to provide relatively shock free transfer of the articles from the plate 93 to the belt.

At the rear end of the frame structure A of bagger 30 are two brackets 101 and 102 (FIG. 2) that are secured to the conveyor housing support leg 40 adjacent its top and at the opposite sides thereof. The weighing machine F is mounted upon the upper, horizontal portions of the brackets 101 and 102 so as to be located adjacent the discharge end of the conveyor B. Vertically depending angle bars 104 and 106, respectively, project from the rear end of the brackets 101 and 102. The bars 104 and 106 support a horizontal table 108 which extends rearwardly of the bagger. The table 108 is vertically adjustable on the bars by bolts 109 in a well known manner.

The conveyor B (FIGS. 8 and 10), which is disposed within the housing 38, comprises two endless chains 120 and 122 of the well known roller type. At regularly spaced intervals therealong, the chains 120 and 122 are each provided with special links which have lateral projections 124 at only one side. The chains are disposed in side-by-side relation with the respective projections 124 arranged in alignment transversely of the conveyor B and extending outwardly thereof in opposite directions. The several pairs of transversely aligned chain projections 124 are interconnected by short, rigid straps 126, all of which are of uniform length. The straps are attached at both ends to the oppositely disposed projections as by rivets 128.

An elongated flexible belt 130 (FIGS. 4 and 8) is carried by the straps 126 of the conveyor. The belt, which may be made of plastic or rubber impregnated fabric, comprises two superposed webs 131 and 132 which are sewed together at regularly spaced intervals along the length of the belt by two closely spaced, transverse rows 133 of stitching. The space between the rows of each pair of transverse rows 133 defines a loop 134 through which one of the straps 126 extends. It will be noted in FIG. 4 that the distance between adjacent loops 134 of the belt is greater than the distance between adjacent straps 126 on the endless chains. Accordingly, the belt hangs loosely between adjacent straps to provide pockets 136 in which the articles are carried upwardly toward the discharge end of the conveyor.

Figures 8, 9:
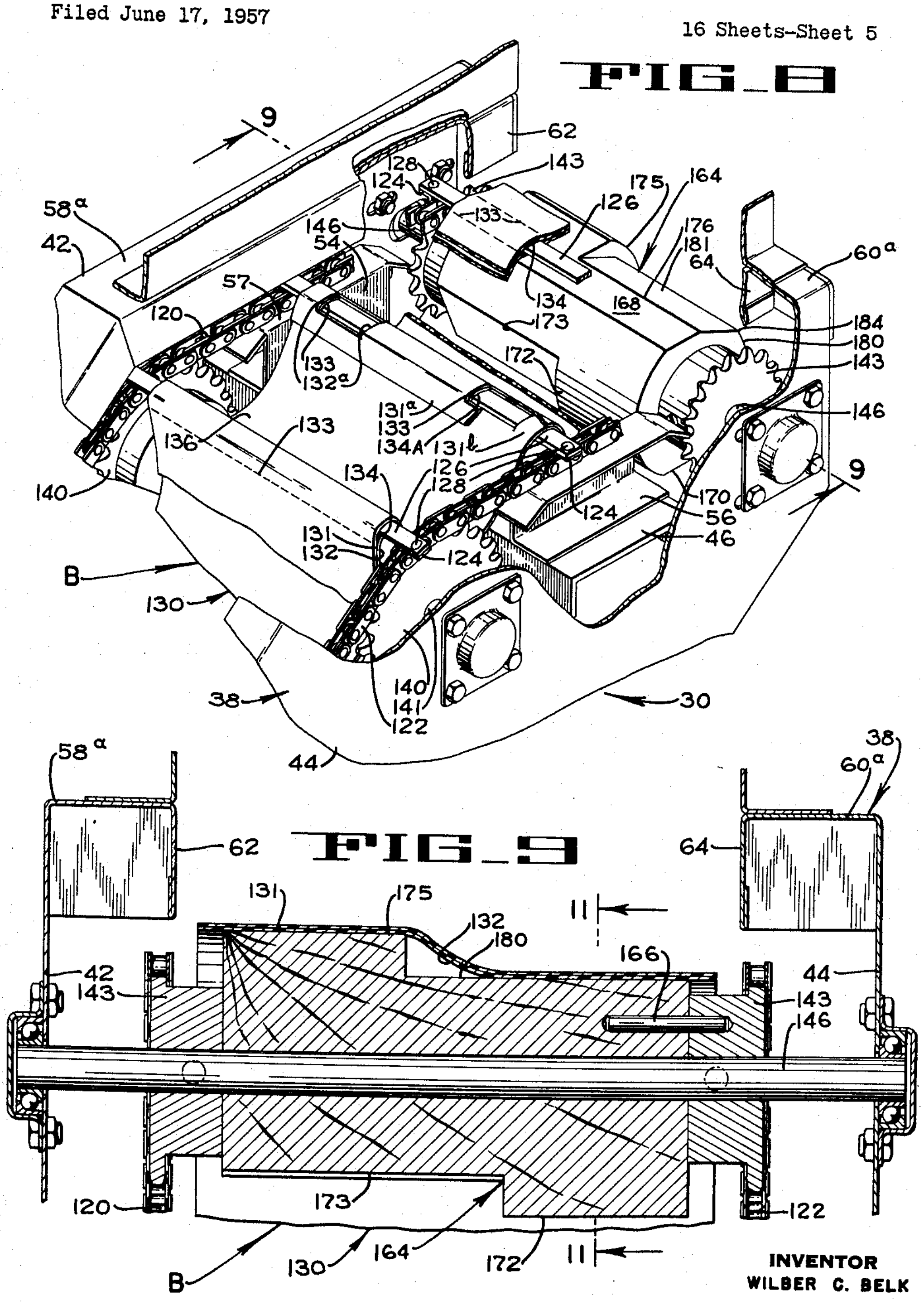
FIG. 8 is an enlarged fragmentary perspective of the discharge end of the present bag filling apparatus, parts thereof being broken away.
FIG. 9 is a vertical section taken along the line 9—9 of FIG. 8, certain parts thereof having been rotated from the position shown in FIG. 8.

All of the loops 134 of the belt are formed as explained above except the loop 134A (FIG. 8) which is formed at the point where the opposite ends of the belt are joined to make the belt into a continuous member. This loop 134A is formed by cutting off the inner web 132 just after the loop 134 nearest the loop 134 at each side of loop 134A and then overlapping the ends 131*a* and 131*b* of the outer web 131. Four longitudinal slits 132*a* are cut in the end 131*a* and four corresponding slits 133 are cut in the end 131*b* and a strap 136 is then threaded through each pair of corresponding slits as shown in FIG. 8.

The endless chain 120 of the conveyor is trained around a lower sprocket 137 (FIGS. 4 and 8) that is fixed to a shaft 138 extending horizontally across the lower end of the conveyor housing, around an upper sprocket 140 rigid with a shaft 141 extending across the housing near the upper end thereof, and around a sprocket 143 that is secured to a shaft 146. Similarly, the endless chain 122 is trained around an identical set of sprockets 137, 140 and 143 which are also secured to the shafts 138, 141 and 146, respectively. The shaft 138 at the lower end of the conveyor housing is operatively connected to the drive mechanism C in a manner which will be described in detail presently.

When the chains 120 and 122 of the conveyor are disposed for operation in the conveyor housing 38 upon the sprockets 137, 140 and 143, it is apparent (FIG. 4) that the belt 130 has an inclined upper run 160 extending between the sprockets 137 and 140. The rails 50 and 52 support the inclined portion of the run 160 while the rails 54 and 56 support the upper horizontal portion thereof.

As previously described in connection with the frame structure A, the vertical legs 62 and 64 (FIG. 10) of the conveyor housing 38 lie inwardly of the sides 42 and 44 of the housing adjacent the inner, longitudinal edges of the track rails 50 and 52, respectively. It is also apparent that the location of the aligned sprockets 137, 140 and 143 adjacent the opposite sides of the conveyor housing 38 is such that the conveyor chains 120 and 122, when trained about the sprockets, are disposed beneath the flanges 58 and 60. The depending legs 62 and 64 on the flanges 58 and 60, respectively, therefore, are disposed interiorly of the conveyor housing 38, relative to the chains 120 and 122. During the upward movement of the conveyor belt 130, the previously mentioned fenders 91 and 92 provide walls at the ends of the pockets 136, which cooperate with legs 62 and 64 and the webs of the channel members 50 and 52 to prevent the articles in the pockets from moving endwise out of the pockets as well as to shroud and enclose the moving conveyor chains to protect the attendant from possible injury. Additionally, the webs of the channels 50, 52, 54 and 56 at the sides of the conveyor have a guiding relation with the side edges of the belt 130.

At the discharge end of the conveyor, the articles are carried over a discharge control roller 164 (FIGS. 8 and 9) which is connected to one of the sprockets 143 by a pin 166. The roller has two diametrically opposite flattened portions 168 and 170 (FIGS. 8 and 13) which extend the entire length of the roller. Each flattened portion is arranged to move into contact with alternate loops 134 of the belt and to maintain this contact as the belt passes around the roller. In FIG. 8 it will be noted that, during the discharge of the articles over the roller, the roller 164 moves in a clockwise direction with the shaft 146. Beyond the trailing side of the flattened portion 168, the roller has a generally semi-cylindrical portion 172 extending in a counterclockwise direction to the diametrically opposite flattened portion 170. As best seen in FIG. 8 and in FIG. 13 which show corresponding positions of the roller, this portion 172 has a recess or step 173 cut therein which extends from the left hand end of the roller (FIG. 8) to a point to the right of the middle of the roller. Similarly, beyond the leading side of the flattened portion 168, the roller 164 has a generally semi-cylindrical surface 175 in which a recess or step 176 is formed, extending from the right hand end of the roller to a point to the left of the middle of the roller. The bottom of each of the recesses 173 and 176 is formed by a narrow flat surface 180 (FIG. 11) and a somewhat wider flat surface 181 which meets the surface 180 at an obtuse angle to form a shallow ridge 184.

Figure 11:
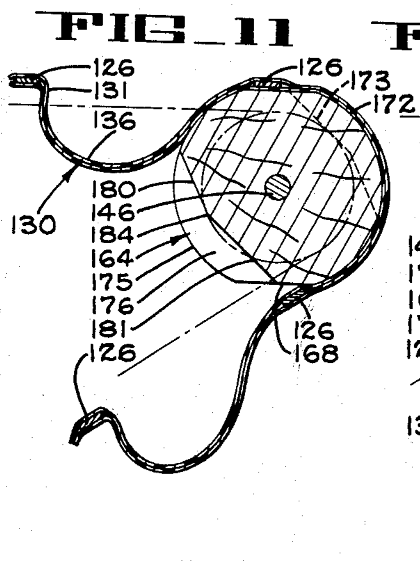
FIGS. 11, 12 and 13 are consecutive diagrammatic views illustrating the operation of the discharge roller used in the present machine, all views being taken on line 11—11 of FIG. 9.
Figure 12:
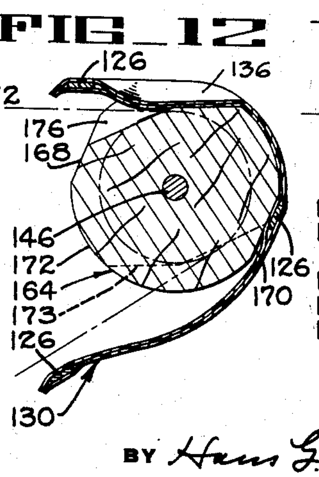
Figure 13:
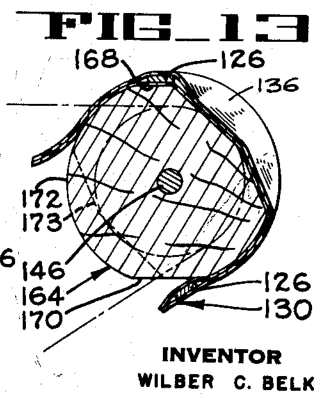

The function of the recesses 173 and 176 during the discharge of articles over the roller 164 is indicated in the operational views of FIGURES 11, 12 and 13. In FIG. 11 it will be seen that the semi-cylindrical surfaces 172 and 175 are formed on a relatively large radius so that, when a portion of the belt 130 is wrapped around that surface, the belt will be stretched out and the article-carrying pocket will be turned inside out and the article in the pocket will be discharged. On the other hand, the portion of the belt pocket that is disposed over one of the recesses 173 or 176 will not be completely turned inside out and an article in that portion of the pocket will not be discharged until the surfaces 180 and 181, which define the bottom of the recess, are inclined downwardly as shown in FIG. 13. Therefore, when two articles which are aligned transversely of the belt 130 are carried along in a pocket of the conveyor, the article in the pocket portion that moves over a semi-cylindrical surface of the roller, will be discharged sooner than the other article which is in the pocket portion that rides over the recess in the roller. In the present machine the articles are delivered over the roller and into a hopper on the weighing machine F. When the desired weight of articles is registered by the scale, the conveyor is stopped. Since the present recessed or stepped roller delivers large articles such as potatoes to the hopper one at a time rather than in pairs, the weighing operation can be performed more quickly and accurately. If granular material, small vegetables, or the like is being carried in the pockets, substantially one half of the contents of each pocket will be discharged into the scale hopper at a time.

When bagging onions, or other relatively small articles, it is desirable to reduce the quantity of articles or material in each pocket so that the amount of produce carried in the pocket will be less than the predetermined amount to be weighed. In the present machine a roller 186 (FIGS. 4 and 10) is mounted at a desirable height under the upper run of the belt so that each pocket will be lifted and the articles, that are raised above the cross strap 126 at the trailing side of the pocket, will fall from the pocket back toward the supply bin 65. Then, when the pocket passes out of contact with the leveling roller 186, the articles remaining in the pocket will have a predetermined depth.

Figure 10:
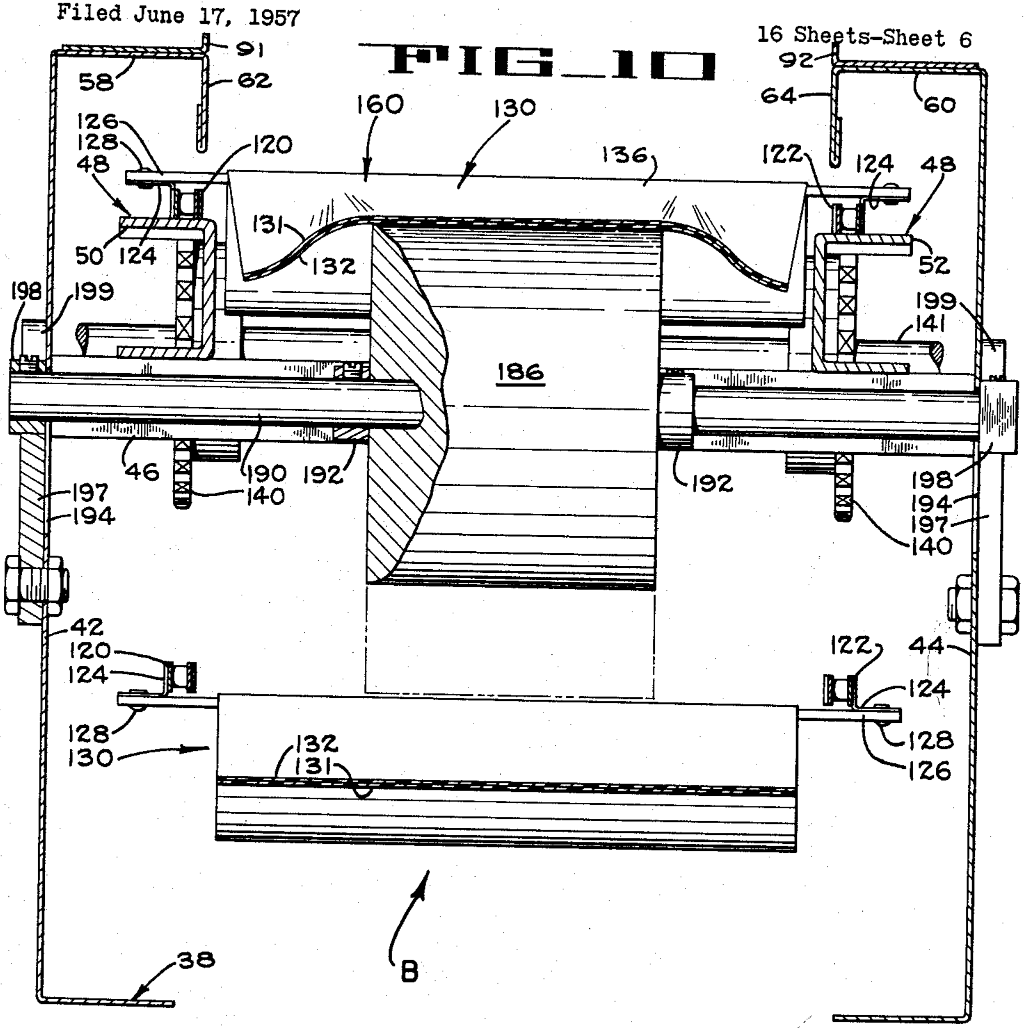
FIG. 10 is an enlarged transverse section taken along line 10—10 of FIG. 4, certain parts having been broken away.

As best shown in FIG. 10, the roller 186 is of relatively large diameter and is substantially half as long as the width of belt 130. The roller is rotatably mounted on a shaft 190 that is disposed horizontally and extends across the conveyor housing 38. A set collar 192, affixed to the shaft 190 at each end of the roller 186, prevents axial movement thereof on the shaft. Opposite ends of the shaft 190 are disposed in a pair of slots 194 (FIGS. 4 and 10) in the sides 42 and 44, respectively, of the conveyor housing 38, and are provided with additional set collars 198 (FIG. 10) exteriorly of the housing. The slots 194, which are aligned transversely of the housing 38, are disposed at substantially right angles to the inclined conveyor run 160. When the leveling roller 186 is not being used, it is disposed in the dotted line position of FIG. 4 with the ends of the shaft 190 resting at the lower ends of the slots 194. When the roller 186 is being used, the ends of the shaft 190 are held in an upper portion of the slots 194 by latching bars 197 (FIGS. 1 and 2), one of which is mounted on each of the walls 42 and 44 of the conveyor housing. Each latching bar has a notch 199 formed in its outer free end, said notch having wall portions disposed at ninety degrees to each other and arranged to engage two of the surfaces of one of the set collars 198. Since the set collars 198 are square, they mate snugly with the notches 199 of the latching bars to retain the leveling roller in its raised position.

It is the purpose of the drive mechanism C to act as a speed reducer as well as to smoothly stop or start operation of the article delivery conveyor B, without the need of having to stop and start the associated motor for each produce weighing operation. The mechanism C comprises a planetary gear assembly 200 (FIGS. 2 and 14) and a brake unit 201. The planetary gear assembly includes a gear case 202 which is continuously driven during the weighing operations by a motor 203 (FIG. 2) through a V-belt 204.

Figures 14, 15:
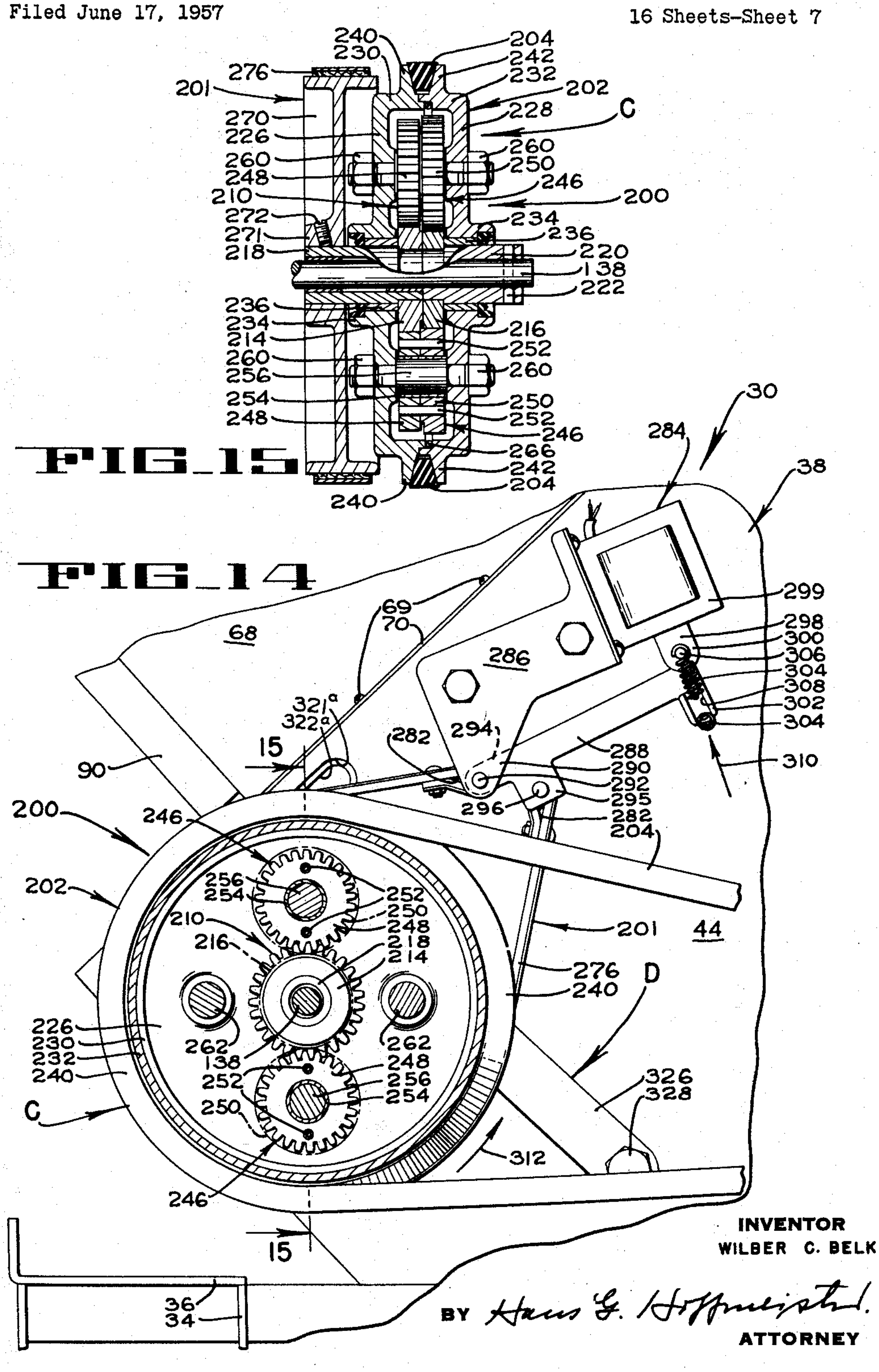
FIG. 14 is an enlarged side elevation of a portion of the present article handling machine, with a cover thereof broken away to disclose internal structure.
FIG. 15 is a vertical section taken along the line 15—15 of FIG. 14.

Gearing 210 is mounted in the case 202 and comprises two sun gears 214 and 216 (FIG. 15). A sleeve-like hub 218 to which the sun gear 214 is affixed adjacent one end thereof, mounts the gear 214 for free rotation on a projecting end of the conveyor drive shaft 138. A similar, sleeve-like hub 220 of the gear 216 is affixed adjacent one end to the projecting end of the drive shaft 138 by a pin 222 for rotation with the shaft. While both sun gears 214 and 216 are of identical circular pitch, the gear 214 has one tooth more than has the gear 216.

The gear case 202 in which the transmission gearing 210 is disposed comprises two symmetrical covers 226 and 228 that are in the form of discs which have mating flanges 230 and 232, respectively, at the outer edges thereof. Adjacent the center of each cover 226 and 228 is a hub 234 in which are suitable bushings 236 for rotatably mounting the covers on the hubs 218 and 220, respectively, of the sun gears 214 and 216. Sealing rings, of any well known type, are also provided in the gear case hubs 234 outwardly thereof beyond the bushings 236 in order to prevent the possible entry of foreign material into the case and the loss of lubricant therefrom.

Each of the two gear case covers 226 and 228 is provided with a radially projecting, peripheral fin 240 and 242, on the flanges 230 and 232, respectively. As best shown in FIG. 15, the fins 240 and 242 have outwardly diverging, frusto-conical surfaces on the adjacent faces thereof when the covers are in assembled relation so as to form a continuous V-groove about the gear case 202. The previously mentioned V-belt 204, which interconnects the motor 203 in driving relation with the transmission C, is disposed in the groove of the gear case 202 and therefore the case acts as a sheave for operating the gearing 210 therein to drive the conveyor B and the agitator mechanism D.

Planet gear assemblies 246 of the gearing 210 are rotatably disposed in the gear case 202 in meshing relation with the sun gears 214 and 216. The gears of the planet gear assemblies 246 are of the same pitch as the sun gears 214 and 216. Each planet gear assembly 246 comprises a first gear 248 meshing with the sun gear 214 and having one tooth less than the sun gear 214. A second gear 250 of each planet gear assembly 246, having one tooth more than the first gear 248 thereof, meshes with the other sun gear 216.

The individual gears 248 and 250 of the two planet gear assemblies 246 are coaxially disposed and are rigidly interconnected by means of pins 252 for unitary rotation. Each gear assembly 246 is axially bored and is disposed on a bushing 254 which forms a projecting shoulder at opposite ends of the assembly. The gear assemblies 246 (FIG. 14) are located in a manner previously described at diametrically opposite points in the gear case 202 with the bushings 254 of the gear assemblies being rotatably disposed upon fixed shafts 256.

Opposite reduced diameter ends of the shafts 256 are suitably threaded and disposed in aligned holes in the opposite gear case covers 226 and 228. Nuts 260, threadedly received on the ends of the shafts 256, are employed to draw the covers 226 and 228 into positive mating relation as well as into positive engagement with the radially enlarged, center part of the shafts 256. The bushings 254 of the gear assemblies 246 mount the gears 248 and 250 thereof in spaced relation to the interior of the opposite covers 226 and 228 for free rotation on the shafts 256 in meshing relation with the sun gears 214 and 216, respectively.

Stud bolts 262 (FIG. 14), which are similar in configuration to the shafts 256 and have nuts thereon (not shown), further aid in holding the covers 226 and 228 of the gear case 202 in fixed relation.

The mating covers 226 and 228 form an internal groove 266 therebetween, when in assembled relation, in which an O-ring seal is disposed. It is the purpose of this seal to close the gear case 202 against the passage of foreign material and lubricant between the assembled halves thereof.

The previously mentioned brake 201 is associated with the end of the hub 218 which projects beyond the left side of the gear case 202 (FIG. 15). A drum 270 (FIG. 15) of the brake 201 has a hub 271 securely attached as by a set screw 272 to the hub 218 of the sun gear 214 for rotation therewith. The drum has a peripheral surface about which a brake band 276 is disposed. It will be noted that the brake band 276 comprises an outer strap of metal or other suitable material which is appropriately provided with an inner lining of friction material. Opposite ends of the brake band 276 have loops 282 (FIG. 14) which are used in holding the band in position for engagement with the drum as well as in actuating the brake 201.

Figures 6, 7:
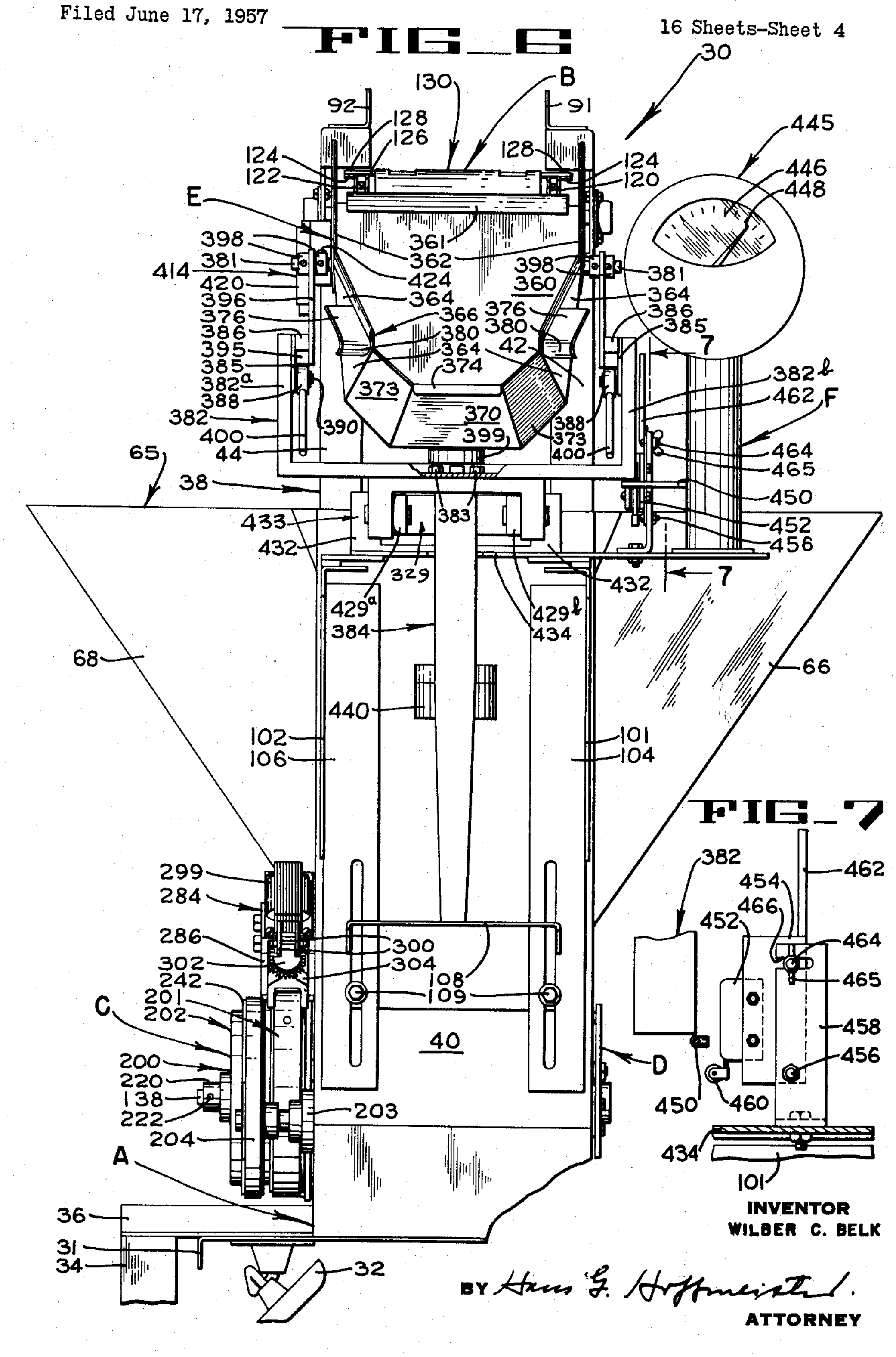
FIG. 6 is an enlarged end elevation of the discharge end of the present bag filling apparatus, certain parts thereof being broken away.
FIG. 7 is an enlarged, fragementary section of a portion of FIG. 6 taken along line 7—7 thereof.

A brake actuator 284 (FIGS. 6 and 14) which is mounted by means of a bracket 286 on the side 44 of the conveyor housing 38 comprises a lever arm 288 which is fulcrumed at one end between opposite legs 290 (FIG. 6) of the bracket 286 upon a pivot pin 292. The end of the lever arm 288 is in the form of a yoke having side legs 294 (one only being shown in FIG. 14), through which the pivot pin passes, disposed at opposite sides of the loop 282 at one end of the brake band 276. The loop 282 at the other end of the brake band 276 is disposed between dependent extensions 295 (FIG. 6) of the legs 294 on the lever arm 288 and is attached thereto by a short rod 296 which is spaced on the arm 288 from the pivot pin 292.

A solenoid 299 (FIG. 14), that is mounted on the brake actuator bracket 286 adjacent the free end of the lever arm 288, is provided with a reciprocable armature 298. At the distal end of the armature are two laterally disposed side extensions 300 (FIG. 6) which are normally disposed at opposite sides of a head 302 on the free end of the lever arm 288. The arm 288 and the armature 298 are resiliently interconnected by means of a tensile spring 304 of suitable strength. Opposite ends of the spring 304 are anchored to the opposite sides of the armature 298 by means of short studs 306 thereon. The loop (FIG. 6) formed in the spring 304 by this manner of attachment of the spring 304 to the armature is disposed about the lever arm head 302 in a shallow channel 308 (FIG. 14). The channel 308 retains the spring in operative position on the head 302 of the lever arm 288. Upon energization of the solenoid 299, the armature 298 is retracted into the solenoid housing. By means of the spring 304 which interconnects the armature and the lever arm 288, the arm is pivoted about the pin 292 in the direction of the arrow 310 (FIG. 14) upon energization of the solenoid 299. Pivotal movement of the arm 288 in this direction is effective to draw the brake band 276 with the friction material 280 into engagement with the drum 270. Moving the arm 288 by means of the spring 304 provides a self adjusting connection.

The drive mechanism C functions in the following manner to transmit power from the motor 203 to the article delivery conveyor B. Assuming that no articles are in the hopper E, the solenoid 299 associated with the brake 201 is energized. When such a condition exists, as previously explained, the brake 201 is set so that the brake drum 270 is held against rotation by the band 276. The sun gear 214, which is connected to the drum 270 by the hub 218, is therefore also held against rotation. As the gear case 202 is driven in the direction of the arrow 312 (FIG. 14) by the belt 204, the planet gear assembles 246 are carried in a circular orbit about the sun gear 214. Due to the meshing engagement of the planet gears 248 with the stationary sun gear 214, the planet assemblies are rotated about their axes as they are carried around by the casing.

The difference in the pitch diameters of the sun gears 214 and 216 prevents the planet assemblies from rolling on the sun gear 216. Accordingly, the planet assemblies drive the sun gear 216 and the conveyor shaft 138 in a direction opposite to the direction of rotation of the casing and at a rotary speed that is approximately one-seventeenth of the rotary speed of the casing. Thus, in operation, when the brake 201 is released, the conveyor stops. When the brake is applied, the conveyor is operated causing articles in the conveyor pockets 136 to be raised toward the upper discharge end of the conveyor.

Figure 16:
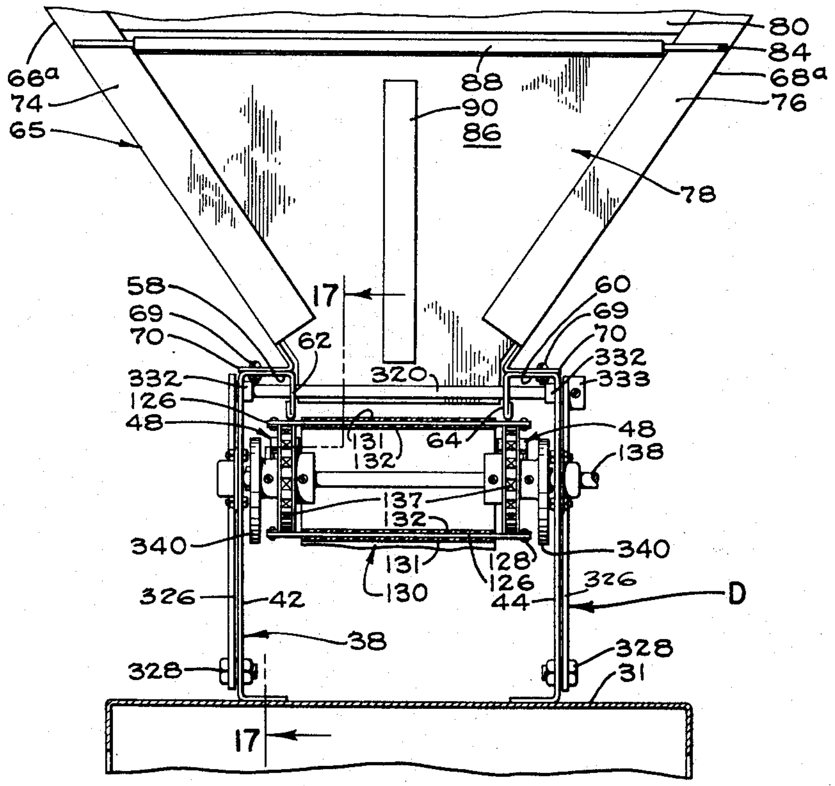
FIG. 16 is an enlarged fragmentary end elevation of the feed end of the present machine, with parts broken away.

The agitator mechanism D (FIGS. 1 and 16) comprises a rod 320 which extends across the lower end of the conveyor housing to provide a movable support for the lower end of the pivoting end plate 86 of the bin. The left hand end of the rod 320 (FIG. 16) passes through a pair of aligned slots 321 and 322 (FIG. 17) in the side wall 42 and in the depending flange 62, respectively. The right hand end of the rod passes through similar slots 321*a* and 322*a* (FIG. 14) in the side wall 44 and in the depending flange 64. Each end of the rod 320 is disposed in a sleeve 332 (FIG. 16), and each sleeve 332 is formed on the free end of an actuator arm 326 which is pivotally mounted on the housing by a bolt 328. A boss 333, which is formed on one of the arms 326, is fixed to the rod 320. A cam follower roller 336 (FIG. 17) is rotatably mounted on the inner surface of each actuator arm 326 in alignment with one of two cam discs 340 (FIG. 16) which are keyed to the conveyor shaft 138. Each follower roller 336 is in operative engagement with one of the discs 340 and, accordingly, when the conveyor shaft 138 is rotated to advance the upper flight of the conveyor, the cam discs 340 periodically swing the actuator arms 326 alternately clockwise and then counterclockwise (FIG. 17) about the pivot bolts 328. This swinging movement of the arms 326 causes the shaft 320 to swing the end plate 86 of the bin back and forth, thus continuously shifting the articles in the bin relative to each other.

Figures 4, 5:
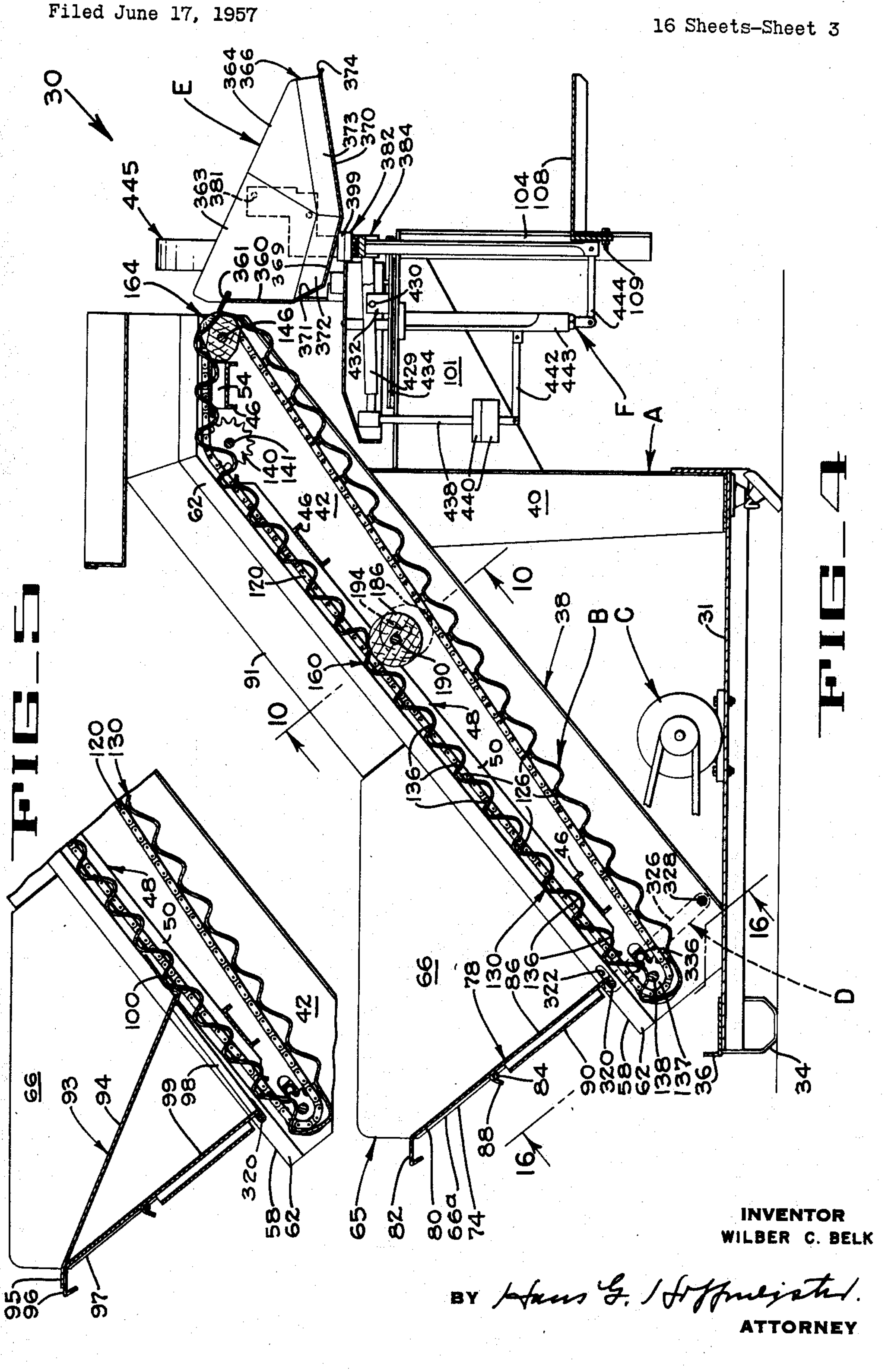
FIG. 4 is a vertical medial section taken longitudinally of the machine of FIG. 1.
FIG. 5 is a fragmentary vertical section taken longitudinally of the machine at the feed end and showing a modified storage bin.

The hopper E is mounted at the rear of the machine in position to receive articles discharged from the conveyor. The hopper, which may be made of sheet metal, has a forward wall 360 (FIG. 4) that is disposed in a substantially vertical position when the hopper is in the article-receiving position of FIG. 4. At its upper end, the wall 360 has a lip 361 that is inclined to direct the articles into the hopper. The hopper has spaced side walls 362 (FIGS. 2 and 6) which have portions 363 projecting rearwardly from the front wall 360, and inwardly slanted rear portions 364 which define the lateral limits of a discharge mouth 366 of the hopper. The floor of the hopper is formed by two panels 369 and 370 (FIG. 4). The forward floor panel 369 is joined to the forward wall 360 by a sloping panel 371, and to each of the forward side wall portions 363 by an outwardly flared transition member 372 (FIG. 2), and the rear floor panel 370 is connected to each of the rear side wall portions 364 by an outwardly flared member 373. A downturned rear edge 374 is formed on the rear floor panel 370. The rear edges of the side wall portions 364, the rear edges of the flared member 373 and the rear edge of the floor panel 370 cooperate to define the discharge mouth or opening 366.

During the actual bagging operations, the attendant must slip the bag over the mouth 366 of the universal hopper and hold it there while he tilts the hopper to discharge the contents therefrom into the bag. To aid the attendant in both holding the bag in place on the hopper as well as in tilting the same, a tilting ledge 376 is provided on each side wall 362. The ledges 376 are affixed (FIGS. 2 and 6) adjacent the mouth 366 to the rear end of the wall portion 364 with a flat upper portion of each ledge disposed in parallel relation to an upper edge of the side wall 362. Each ledge is provided with a downwardly curved rear end 380.

Figure 18:
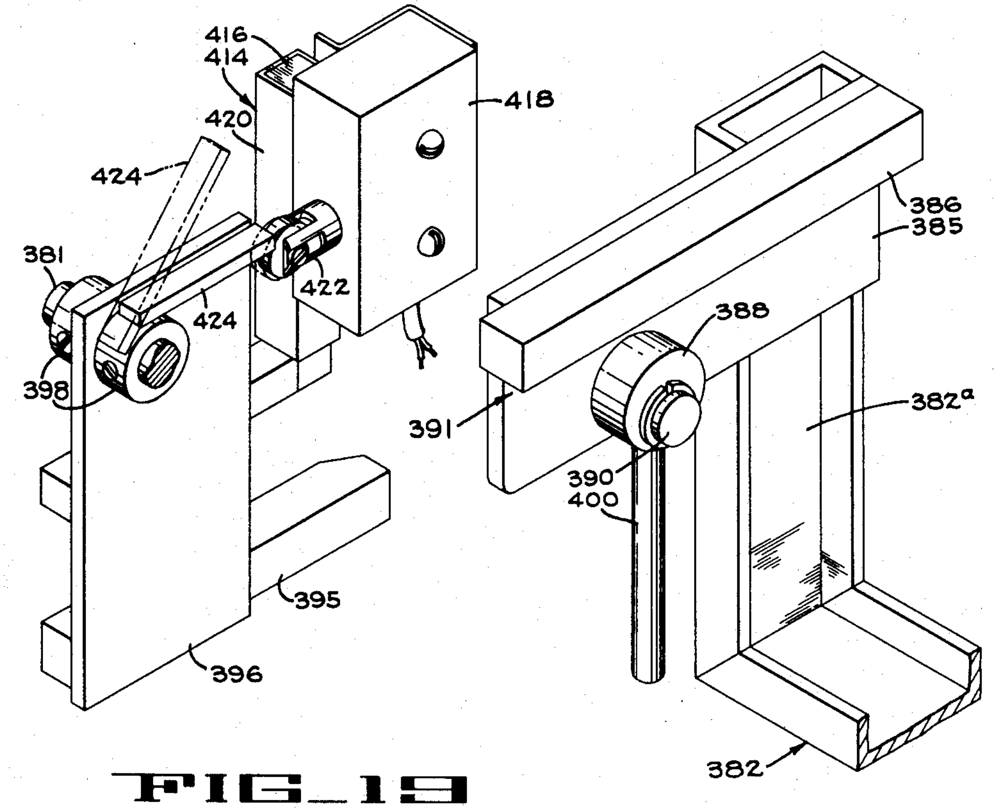
FIG. 18 is an enlarged, fragmentary exploded perspective of related elements of the present apparatus.

The hopper E, which has a pivot pin 381 (FIG. 6) projecting laterally from each side wall, is supported on a U-shaped bracket 382. The member 382 is secured by bolts 383 to a T-shaped member 384 that is part of the weighing machine F which will be described presently. The U-shaped member 382 has two upstanding arms 382*a* and 382*b*, and each of these arms carries a plate 385 (FIG. 18) which has a guide bar 386 secured to its inner face in spaced relation above a locking cam disc 388 that is eccentrically mounted on a pin 390 projecting inwardly from the plate 385. The space between the bar 386 and the top surface of the cam disc 388 provides a guideway 391 which is adapted to receive a slide bar or feather 395 secured, as by welding, to a vertical mounting plate 396 which has, near its upper end, an opening (not shown) through which one of the pivot pins 381 of the hopper extends. Set collars 398 are secured to the pivot pin 381 on each side of the plate 396 to position the side wall of the hopper relative to the plate 396. With this arrangement, the mounting plates 396 of the hopper are arranged to be slidably positioned on the arms 382*a* and 382*b* of the U-shaped bracket 382.

The hopper is put into place on the machine by first raising the hopper to an elevated position adjacent the upper rear end of the conveyor housing with the two slide bars 395 of the hopper in alignment with the two guideways 391 of the U-shaped bracket 382. The hopper is then moved toward the conveyor housing, causing the slide bars to enter the guideways. When the lip 361 (FIG. 4) on the front wall of the hopper is disposed in the article-receiving position with the floor panel 370 resting on a bumper 399 (FIG. 4) carried by the U-shaped bracket 382, the eccentric locking cam discs 388 (FIG. 18) are rotated by means of handles 400, causing the slide bars 395 to be locked between the cam discs and the guide bars 386.

As seen in FIG. 2, the vertical mounting plate 396 adjacent one side wall of the hopper has an L-shaped switch-mounting bracket 414 secured thereto. This bracket 414 has an upwardly projecting, vertical leg 416 (FIG. 18) that is square in transverse cross section. A switch 418 of the electrical control system is mounted on the vertical leg 416 by means of a square sleeve 420 which is arranged to be slipped over the leg. The switch 418, which is normally open and may be of any well-known type, is so positioned on the bracket 414 that an actuator 422 of the switch is in horizontal alignment with the pivot pin 381 at that side of the hopper. One of the set collars 398 on the pin 381 is provided with an arm 424 which engages the actuator 422 when the hopper is in article-receiving position, and moves the arm in a direction to close the contacts. When the hopper is tilted, the arm 424 releases the actuator 422, permitting the contacts to open.

The weighing machine F comprises a balance beam 429 (FIG. 4), having spaced projections 429*a* and 429*b* (FIG. 6) on which the T-shaped hopper support member 384 is pivotally mounted. The balance beam is fulcrumed upon a pivot rod 430 (FIG. 4) that is fixedly mounted in cooperating bosses 432 (FIG. 6) of a bracket 433 which is secured to and projects upwardly from a bedplate 434. The bedplate is rigidly secured to the brackets 101 and 102 so that the weighing machine is entirely supported by the frame structure.

A counterbalance rod 438 (FIG. 4) extends downwardly from one end of the balance beam. This rod is arranged to receive removable counterweights 440 for the purpose of balancing the weight of the hopper and the weight of the articles in the hopper. A link 442 is connected between the rod 438 and a rigid mast 443 which projects downwardly from the underside of the bedplate 434. A second link 444 interconnects the lower end of the mast 443 with the T-shaped hopper support member 384.

At the right side of the weighing machine F (FIG. 6) is an indicating unit 445 that is mounted upon the bedplate 434. The unit has a dial 446 and a pointer 448 which moves across the dial and indicates, when vertically disposed, that the produce delivered to the hopper E by the conveyor B has reached the predetermined weight as determined by the counterweights 440. The pointer 448 is moved by engagement of the hopper mounting bracket 382 with a cantilever arm 450 that is associated with the dial 446. No matter what the quantity of produce to be measured, the hopper mounting bracket 382 will always be lowered substantially the same amount. The arm 450 is employed to actuate a normally closed switch 452 of an electrical system which will be described presently.

The arm 450 is arranged to actuate a normally closed switch 452 (FIG. 7) which is affixed to a switch mounting plate 454 that is pivotally attached by means of a bolt 456 to a vertical bracket 458. The bracket 458, in turn, is affixed in any suitable manner to the bedplate 434 so as to dispose an actuator 460 of the switch 452 in the path of travel of the arm 450. In order to obtain a precise adjustment of the switch actuator 460 relative to the arm 450, the switch mounting plate 454 can be pivoted fore and aft of the bagger about the bolt 456 by means of an upstanding handle 462 on the plate. Above the pivot bolt 456 is a clamping bolt 464 which extends through the plate 454 and is disposed in a horizontal slot 466 in the bracket 458. Upon tightening a wing nut 465 disposed on the bolt 464, the plate 454 is clamped to the bracket 458 in order to maintain adjustment of the plate after correct alignment of the switch actuator with the cantilever arm 450 has been achieved. Upon engagement of the cantilever arm 450 with the switch actuator 460 when the hopper has come to weight, the contacts of the switch 452 will be opened.

In FIG. 3 the electrical control system is diagrammatically shown as comprising three circuits, 471, 472, and 473, that extend between electrical service leads 474 and 475, and a holding circuit 476. The circuit 471 comprises the normally open hopper switch 418, the normally closed weight switch 452 and a relay R, connected in series. The relay R has two sets of normally open contactors R1 and R2. Contactor R1 is disposed in the circuit 472 in series with the brake actuating solenoid 299. The contactor R2 is in the holding circuit 476 for the relay R. The coils of the bagger drive motor 203 are in the circuit 473. A main control switch 477 is connected between the leads 474 and 475, and supply lines L1 and L2 of a source of suitable electrical energy (not shown).

Throughout the preceding portion of the specification, the operation of the present bag filling apparatus has been given concurrently with a detailed description of the structure. Since it only remains to coordinate the function of the electrical system with the operation of the various mechanical components of the present bagger, this will be dealt with in the following operational description.

In putting the bagger into operation the attendant first installs the correct weights 440 on the rod 438 at the forward end of the balance beam 429 in order to compensate for the weight of the hopper E and the desired weight of the articles, such as potatoes. After supplying the bin 65 with potatoes, the attendant closes the main switch 477 and the apparatus is in operation.

Figure 19:
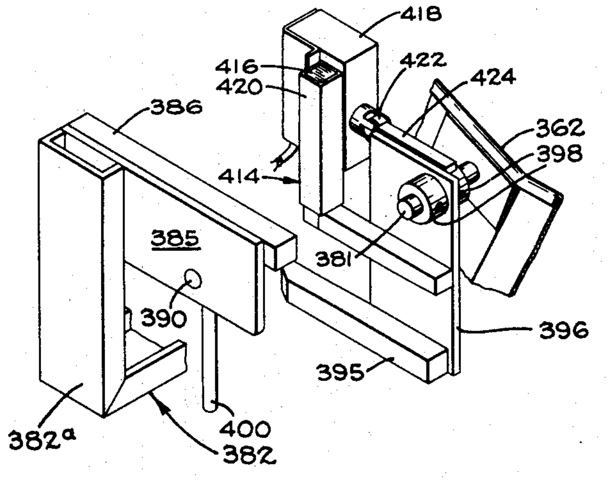
FIG. 19 is an exploded perspective of the members shown in FIG. 18, the view being at reduced scale and taken from the opposite side of the members.

It will be recalled that the normally open hopper switch 418 in the circuit 471 is held closed by the arm 424 of the hopper (FIGS. 18 and 19) when the hopper is in an article receiving condition and the weight switch 452 in the same circuit, which is normally closed, remains closed until the hopper comes to weight. This assures that the relay R, associated with the switches 418 and 452 will be immediately energized as soon as the main switch 477 is closed. Therefore, the normally open contactors R1 and R2 in the circuits 472 and 476, respectively, will be closed as soon as the relay R is energized. Closing of the contactor R1 completes the circuit 472 and the brake solenoid 299 is energized. Closing of the contactor R2 establishes a holding circuit to keep the relay R energized unless the weight switch 452 is opened.

When the brake 201 is set by energization of the brake solenoid 299, the brake drum 270 is effectively held against rotation so that the sun gear 214, associated with the brake drum, is held stationary. This causes rotation of the two planet gear assemblies 246 on their shafts 256 as the assemblies are carried in a circular orbit with the gear case 202 as it is driven by the motor 203. Driving force is applied to the sun gear 216 that is affixed to the conveyor drive shaft 138 to drive the article delivery conveyor B. Potatoes are carried upwardly from the bin 65 in the pockets 136 of the conveyor belt 130 to the discharge roller 164. During operation of the conveyor B, the agitator mechanism D is also in operation and the combined action of either the plate 86 (FIG. 4), or plate 94 (FIG. 5), with the movement of the conveyor belt 130 prevents bridging of the articles in the bin 65.

At the upper end of the conveyor housing 38, the pockets 136 formed in the belt 130, are acted upon by the discharge roller 164 to discharge the potatoes from the pockets as the belt moves around the roller. As the potatoes are discharged from the pockets 136, they drop toward the universal hopper E. The lip 361 across the top of the forward wall 360 of the hopper, as well as the adjacent ends of the side walls 362 which rise above the lip, assure that all of the potatoes which are discharged from the pockets 136 will enter the hopper.

Figure 17:
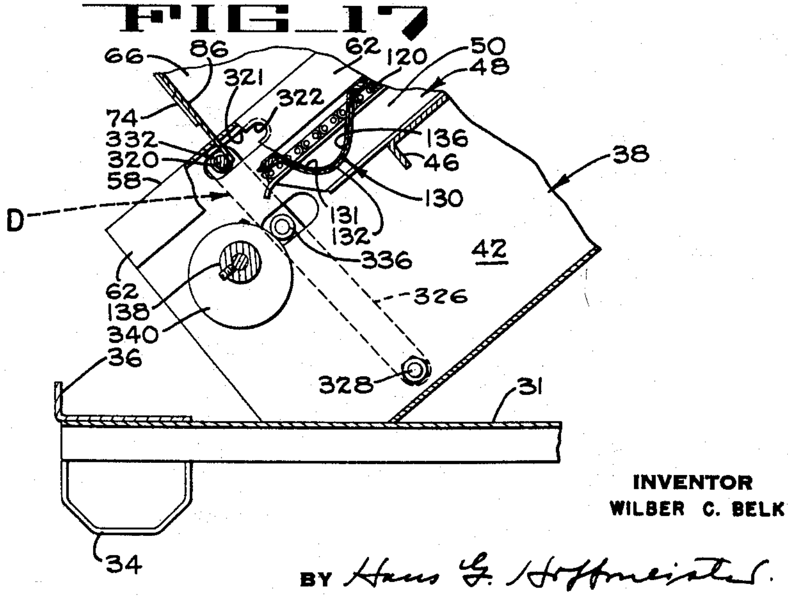
FIG. 17 is a vertical section taken along the line 17—17 of FIG. 16.

At the time a predetermined weight of potatoes has been delivered to the hopper so as to tilt the rear end of the balance beam 429 downwardly against the action of the counterbalance weights 440, the hopper assembly is in its lowest position. The hopper mounting bracket 382 will have engaged the cantilever arm 450 of the indicating dial 446, and the arm 450 will have accordingly been moved into engagement with the weight switch 452. Such action is effective to open the contacts of the switch 452 in the circuit 471 and deenergize the relay R therein, even though the hopper switch 418 is still held closed by the arm 424 (FIG. 17). When the relay R is deenergized, the contactor R1 thereof in the circuit 472 is returned to its normally open position to thereby deenergize the brake actuating solenoid 299 and release the brake 201. Upon release of the brake 201, the gearing 210 in the planetary gear mechanism is disengaged from driving engagement with the drive shaft 138 while the motor 203 continues to operate. Thereupon, both the article delivery conveyor B and agitator mechanism D discontinue operation and further delivery of potatoes to the hopper E is stopped.

The attendant having put the open end of a bag about the mouth 366 of the hopper E, as previously explained, both holds the bag in place and tilts the hopper by use of the tilting ledges 376 thereof. Tilting of the hopper pivots the arm 424 out of engagement with the actuator 422 to thereby open the switch 418.

As the potatoes roll, tumble and slide from the hopper E they are guided toward the hopper mouth 366 by the converging side wall portions 364 and floor panel 370. As the potatoes leave the mouth 366, they move across the downturned rear edge 374 on the panel 370 and into the bag. The edge 374 is smoothly formed to prevent injury to the potatoes as they leave the hopper. The weight of the potatoes filling the bag brings the bottom thereof to rest against the suitably elevated table 108 at the rear end of the brackets 101 and 102.

Before the hopper E is pivoted into article receiving condition (FIG. 4) about the pins 381, the attendant releases his grip on the hopper. The counterweights 440, accordingly, pivot the balance beam 429 about the pivot rod 430 of the weighing machine F to raise the hopper E. Thereupon, the weight switch 452 of the circuit 471 is closed but, because the weight switch is in series with the hopper switch 418 which is still open, the relay R will not be energized and the conveyor does not yet resume movement. Simultaneously with his release of the hopper E the attendant, who is still holding the open end of the filled bag, picks the same up to set it aside preparatory to the next bag filing operation. In so doing, his upward movement of the bag is used to pivot the hopper into article receiving condition against the bumper 399. This action is effective to close the hopper switch 418 by the action of the arm 424 on the actuator 422 (FIG. 17). Both the weight switch 452 and the hopper switch 418 are now closed. Accordingly, the relay R is re-energized, and as previously explained, the drive mechanism C is therefore engaged to initiate another bagging operation. It will be noted that, after both the weight switch 452 and the hopper switch 418 are open signifying the end of one bag filling operation, the conveyor B cannot be started until both the switches are closed.

Figure 20:
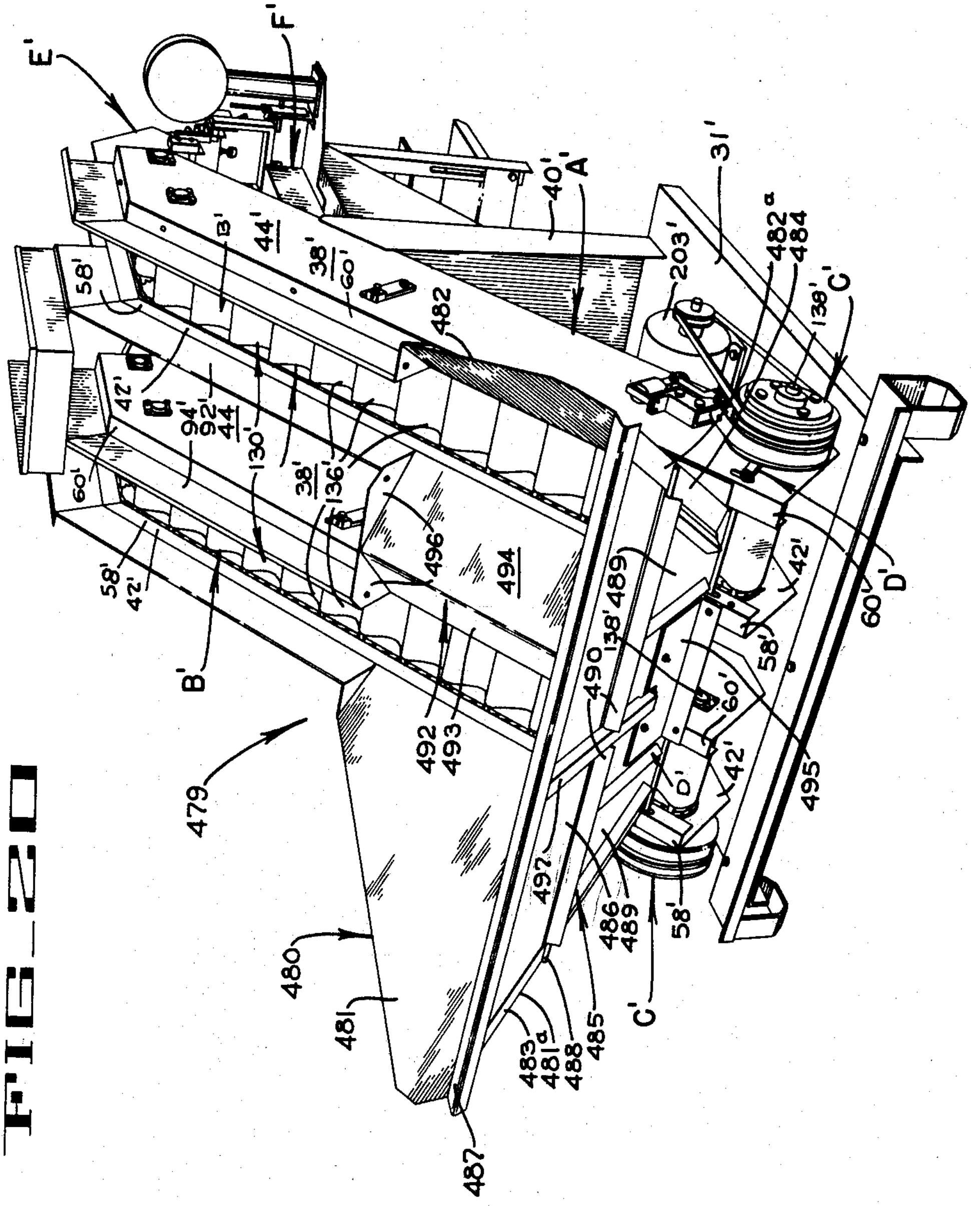
FIG. 20 is a perspective of a modified form of the present article handling apparatus viewing the same from the feed end of the machine and at one side thereof.

A modified form of the bagger of the present invention is shown in FIG. 20 and identified by the reference numeral 479. Since very close similarity exists between the bagger 479 and the bagger 30 of FIG. 1, the description of the bagger 30 will be relied upon for a detailed understanding of the present modified bagger 479. However, where it is necessary to describe the bagger 479, like reference characters will be used to identify parts common to both baggers except for the addition of a prime accent as a suffix mark to the reference characters of the bagger 479.

A bulk lot of articles is first deposited into a bin 480 of the bagger 479 by an attendant. The bin 480 is located adjacent one end of a frame structure A′, within which are two adjacently disposed article conveyors B′. Driving power for moving each of the two conveyors B′ is supplied by electric motors 203′, (only one of which is shown) through a selectively controlled drive mechanism C′ for each conveyor.

In order to assure that all articles in the bin 480 will ultimately gravitate to the conveyors B′ to be picked up thereby, an agitator mechanism D′ is provided in the bin. Articles which are removed from the bin 480 by the conveyors B′ are transported and elevated thereby to the upper end of the frame structure A′. Both conveyors B′ discharge their produce into identical hoppers E′ (one only being shown).

Each of the hoppers E′ is movably supported upon a weighing machine F′. When a predetermined weight of articles has been delivered by either of the conveyors B′ to the hopper E′ associated therewith, the hopper E′ moves downwardly a predetermined distance. Such movement is effective to condition an electrical system of two electrical systems, one of which is associated with each conveyor B′ to thereby disengage the respective drive mechanism C′ so as to stop the associated conveyor B′ and agitator mechanism D′. Therefore, no more articles are delivered to the hopper E′ by the associated conveyor B′ until the contents of the hopper is discharged. The discharge of produce from the hopper E′ is accomplished manually by the attendant as in the case of the bagger 30. When the hopper is empty and returned to the article receiving condition, the respective electrical system is conditioned to thereby activate the drive mechanism C′ and again initiate movement of the associated conveyor B′ and operation of the associated agitator mechanism D′. In this manner, the two hoppers E′ are filled repeatedly with a predetermined weight of articles. It will be noted that by use of the modified form of bagger 479, the attendant may fill bags first from one hopper and then from the other in rapid order in less time than would be possible by use of the bagger 30 (FIG. 1) with only one article delivery conveyor.

A plate 31′ of the modified bagger 479 (FIG. 20), which is similar to the plate 31 of the bagger 30 (FIG. 1), forms the base of the frame structure A′. Adjacent the front end of the base plate 31′ is attached one end of each of two elongated, generally rectangular housings 38′ in each of which an article delivery conveyor B′ is operably disposed. From their point of attachment to the base plate 31′ the conveyor housings 38′ are inclined upwardly and rearwardly. A leg 40′, fabricated of sheet metal and having the form of a channel member, supports the rear, upper end of each conveyor housing 38′.

Each of the conveyor housings 38′ comprises two laterally disposed sides 42′ and 44′ of modified channel shape which are held in uniformly spaced relation. Along the top edges, the conveyor housing sides 42′ and 44′ are provided with flanges 58′ and 60′, respectively. In all other respects, the construction of each of the two conveyor housings 38′ of the present bagger 479 is identical to the construction of the single conveyor housing 38 of the bagger 30.

The bin 480 of the frame structure A′ of the modified bagger 479 is located adjacent the feed ends of the conveyor housings 38′. The bin 480 comprises two oppositely disposed side panels 481 and 482 which are of generally triangular configuration. Along one lower edge, each of the panels 481 and 482 is attached to one of the conveyor housings 38′ along the outermost side thereof. In such an arrangement the panel 481 is attached to the flange 58′ of the side 42′ of the left-hand conveyor housing 38′. The other hopper panel 482 is attached to the flange 60′ of the side 44′ of the right-hand conveyor housing 38′.

It will be noted (FIG. 20) that the front edges 481*a* and 482*a* of the bin sides 481 and 482 are angled upwardly and forwardly from their point of attachment to the conveyor housings 38′. These panel edges are bent inwardly of the bin providing an elongated lip 483 and 484, respectively, on the panels 481 and 482. An end wall 485 extending transversely across the front of the bin 480 is disposed at the side of the lips 483 and 484 interiorly of the bin. This wall comprises an upper fixed part 486 which is attached to the oppositely disposed lips 483 and 484. Along the top of the upper wall part 486 is a ledge 487 that serves the same purpose as the ledge 82 of the single conveyor bagger 30 of FIG. 1. Spaced from the wall 486, immediately therebelow, is a rod 488 extending horizontally across the bin 480. The rod 488 is affixed to the lips 483 and 484 exteriorly thereof at the front of the bin and serves to support and pivotally mount two oppositely symmetrical plates 489 which are located interiorly of the bin and together extend entirely across the bin 480 between the panels 481 and 482. The top edges of the plates 489 are forwardly hooked as at 490 in order to pivotally support the plates upon the rod 488 for swinging movement of the plates inwardly of the bin. At their bottom edges the plates 489 extend below the upper edges of the two conveyor housings 38′. If desired, the auxiliary plate 93 (FIG. 5) may be used in the bin 480 of the bagger 479.

It will be noted that the conveyor housings 38′ of the present modified bagger 479 (FIG. 20) are spaced apart throughout their entire length. The portion of this space in the bin 480 between the housings 38′ is closed by a deflector 492 which is in the shape of an inverted V-trough. The deflector 492 has substantially the same dimension extending in a direction longitudinally of the conveyor housings 38′ as the side panels 481 and 482. Opposite sides 493 and 494 of the deflector 492 are affixed to the flanges 60′ and 58′ of the sides 44′ and 42′, respectively, of the housings 38′. At its opposite ends the deflector 492 is provided with transverse end plates 495 and 496. The plates project at right angles to the conveyor housings 38′. The lowermost end plate 495 at the front end of the bin 480 is disposed in the plane of the lips 483 and 484. Centrally of the end 495 is a vertical tie 497 that extends below the upper part 486 of the end wall 485 and is affixed to both the upper part 486 as well as to the deflector end plate 495. The rearmost end plate 496 extends between a barrier 94′ of the left-hand conveyor housing 38′ and a barrier 92′ of the right-hand conveyor housing 38′.

It may be understood that with the exception of the bin 480, above described in detail, a clear understanding of the frame structure A′ of the modified bagger 479 may be had from the more detailed description of the frame structure A of the bagger 30.

The article delivery conveyor B′ in each of the two housings 38′ comprises a movably mounted belt 130′ having pockets 136′ in which articles of produce are elevated and conveyed from the bin 480 to the rear, discharge end of the bagger. Each conveyor B′ of the modified bagger 479 is identical in all respects to the conveyor B of the bagger 30 previously described in detail.

The drive mechanism C′ associated with each article delivery conveyor B′ of the modified bagger 479 is identical to the drive mechanism C described in conjunction with the bagger 30 (FIG. 1). It will be noted that the drive mechanisms C′ are disposed at opposite sides of the respective conveyor housings 38′.

While the agitator mechanisms D′ of the modified bagger 479 (FIG. 20) are not clearly shown, it may be understood that one agitator mechanism D′ is located at the front end of the outer side wall of each conveyor housing 38′. Each agitator mechanism D′ is operated in synchronism with one of the article delivery conveyors B′, and is arranged to oscillate one of the pivotally mounted plates 489 of the bin through a cam mechanism associated with the drive shaft 138′ of the conveyor.

While the electrical system associated with each of the article delivery controls C′ of the bagger 479 has not been shown, it will be understood that each system is exactly the same as the electrical system of the bagger 30 and therefore no description of the electrical system will be given. If it is desired to bag one particular product, either one or both of the motors 203 of the article delivery conveyors B′ are energized as in the case of the article delivery conveyor B of the bagger 30. The conveyors B′ operate independently of each other to deliver articles to the respective hoppers E′ from the bin 480. It is possible by use of the bagger 479 to supply the bin 480 with different types of produce at opposite sides of the central deflector 492 for simultaneous bagging operations.

Figures 21, 22:
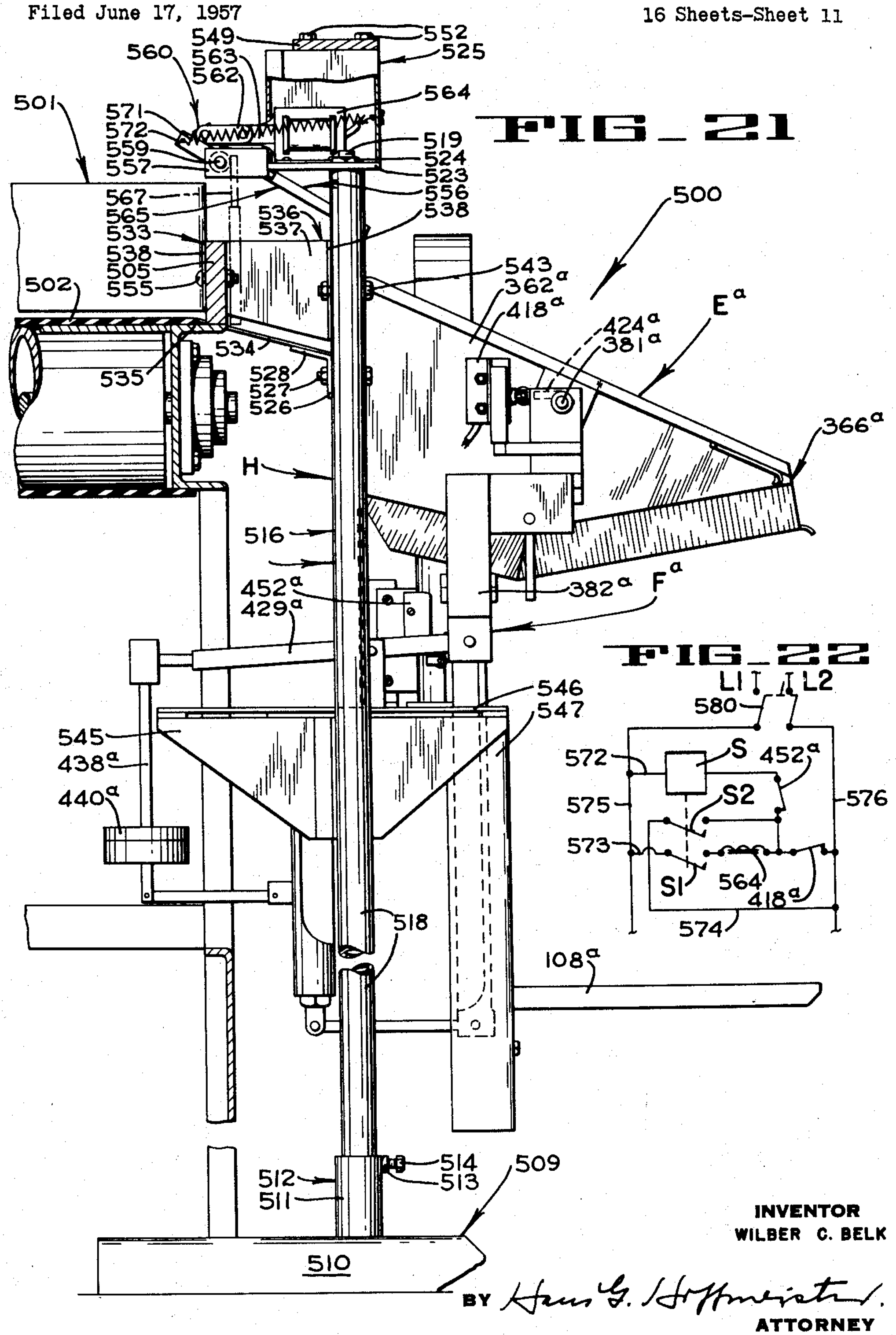
FIG. 21 is a side elevation of another modified form of the present invention, certain parts thereof having been broken away.
FIG. 22 is a diagram of the electrical system of the apparatus shown in FIG. 21.
Figure 23:
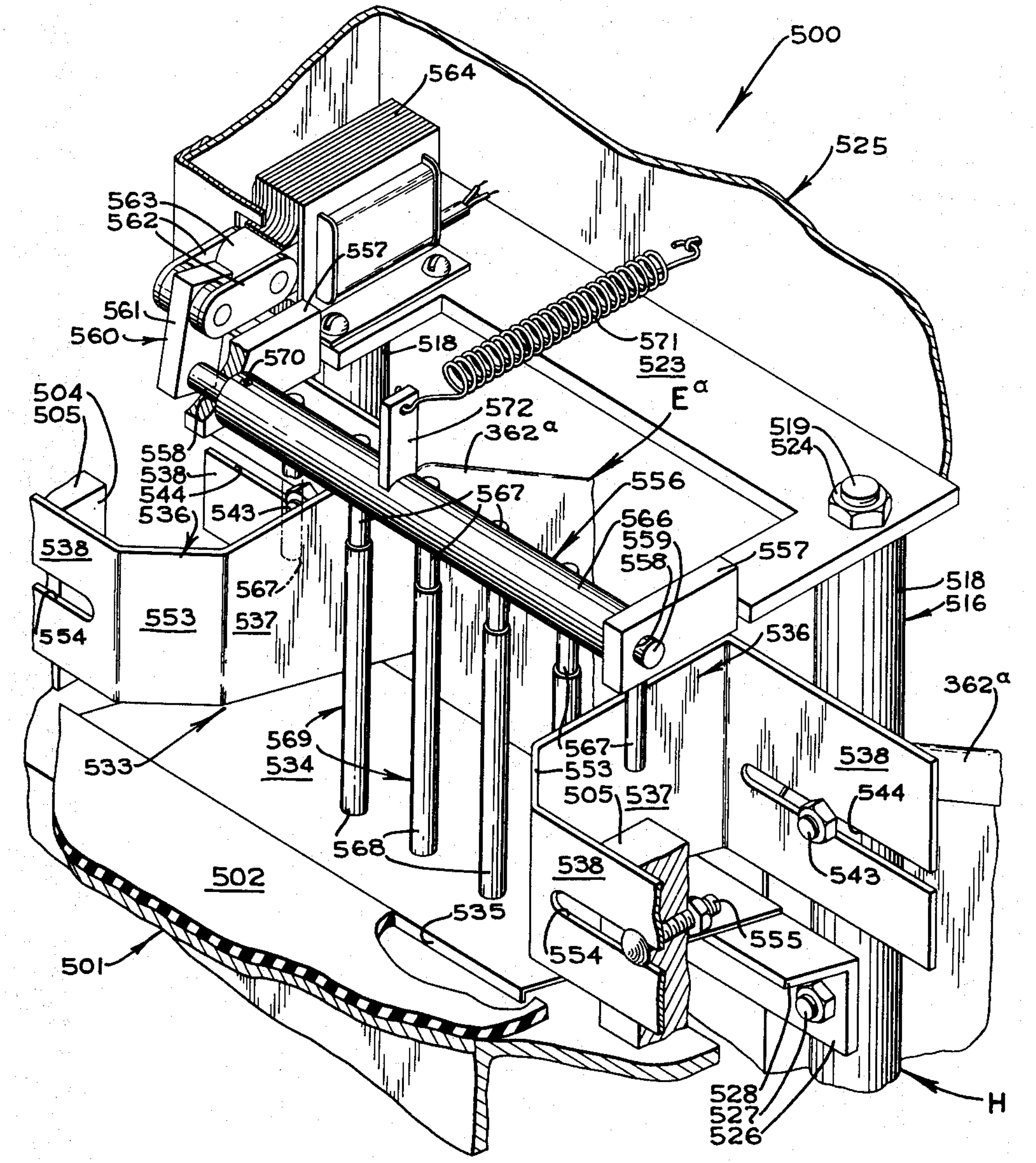
FIG. 23 is an enlarged perspective of a portion of the apparatus shown in FIG. 21, certain parts being broken away.

Another modified embodiment of the bagger of the present invention is shown in FIGS. 21, 22 and 23 and identified by the reference numeral 500. Because of the similarity between the baggers 30 and 500, the description of the bagger 30 will again be relied upon for a detailed understanding of certain portions of the present modified bagger 500. Therefore, where structure of the bagger 500 is described which is similar to that of the bagger 30, like reference characters will be used to identify parts common to both baggers except for the addition of the suffix "*a*" to the reference characters of the bagger 500.

The bagger 500 is adapted for use in conjunction with a conveyor in which oppositely moving conveyor belts operate to repeatedly circulate produce past an inspection station or discharge opening. Such a conveyor is commonly referred to as a return flow conveyor. Referring to the drawings, and to FIGS. 21, 22 and 23 in particular, the modified bagger 500 comprises a frame structure H which adapts the bagger 500 for use in conjunction with a return flow type of conveyor 501.

The bagger 500 may be moved into position adjacent the conveyor 501 and attached thereto by means of the frame structure H. It will be presumed that a belt 502 of the conveyor is in operation and that the articles of produce are advanced by the moving conveyor belt 502 to a point in front of a discharge opening 504 in a side wall 505 of the conveyor. Accordingly, some of the articles will be discharged from the conveyor through the opening 504 and into a hopper E*a*. The hopper E*a* and a weighing machine F*a* upon which the hopper is mounted are identical to corresponding structure of the bagger 30.

The frame structure H comprises a base 509 (FIG. 21) which has two feet 510 (only one of which is shown), of right-angle cross section. A cylindrical sleeve 511 is mounted on each foot with the bottom end of the sleeve disposed upon the bottom flange and welded or otherwise secured thereto about midway of the length of the foot to provide an upstanding socket 512. A rigid strap 513 extends horizontally between the two sockets 512 to interconnect the feet 510 and thereby form the base 509. A set screw 514 is threadedly received in each socket 512.

A vertically adjustable body 516 of the frame structure H comprises two vertically disposed, cylindrical columns 518 (FIGS. 21 and 23). Each column 518 is provided at its top with a threaded stud 519 (only one of which is shown) that extends thereabove in coaxial relation. A plate 523, which is affixed to the top of the columns 518 by nuts 524 (only one of which is shown), interconnects the columns in suitable spaced relation so that the lower ends of the columns will fit into the sockets 512 of the base 509. A box-like enclosure 525 fits around the plate 523 and extends thereabove for purposes to be made clear hereinafter. The columns 518 of the adjustable body 516 are further interconnected by an angle member 526 that is attached to the columns as by bolts 527 (only one of which is shown). The angle member 526 is spaced below the plate 523 and is provided with an upwardly and forwardly inclined flange 528.

An article delivery chute 533, for conducting articles from the conveyor 501 to the hopper E*a*, is provided on the front of the frame body 516. A floor 534 (FIG. 23) of the chute 533 is affixed to the inclined flange 528 of the angle member 526 and projects forwardly therefrom at the same angle as the flange. The floor 534 of the chute is substantially equal in width to the spacing of the side walls 362*a* of the hopper E*a* and the width of the opening 504. The front edge of the chute floor 534 is bent downwardly to provide a lip 535 therealong of substantially the same height as the thickness of the conveyor belt 502. The sides of the chute comprise modified channel sections 536 which are disposed with the webs 537 thereof adjacent the lateral edges of the floor 534 and with the flanges 538 projecting laterally of the chute. The rearmost flanges 538 of the channel sections 536 are attached as by bolts 543 to the columns 518 of the frame body 516 above the floor 534 at the sides thereof. A horizontally disposed, open ended slot 544 is provided in both rear flanges 538 to receive the bolts 543 for securing the channels 536, in laterally adjustable relation, to the columns 518. In this way the article delivery chute 533 can be varied in width in order to vary the flow of articles therethrough or to adapt it for handling different produce. Below the chute 533 on each column 518 of the bagger 500 is a bracket 545 and these two brackets form a shelf 546 upon which the weighing machine F*a* is mounted.

At the rear end of each bracket 545 (FIG. 21) is a vertically depending angle bar 547. A table 108*a*, which projects rearwardly of the bagger 500, is attached to the two spaced angle bars 547 for vertical adjustment thereon. For a more complete understanding of the table 108*a* reference may be made to the table 108 of the bagger of FIG. 1.

When attaching the bagger 500 to a conveyor such as the conveyor 501 (FIGS. 21 and 23), the columns 518 of the frame body 516, which are disposed with their lower ends in the base sockets 512, are adjusted vertically therein to bring the bagger chute 533 to a suitable height for cooperation with the discharge opening 504 in the side 505 of the conveyor. Thereafter the set screws 514 in the sockets 512 are tightened against the columns 518 to hold the frame body 516 at the desired adjusted height.

If two baggers 500 are to be used as a unit (not shown), as may be understood from the description of the bagger 479 (FIG. 20), the frame bodies 516 of two baggers 500 are interconnected. For this purpose a strap 549, which extends between the top of the box-like enclosures 525 (FIG. 21) of the two baggers 500, is attached to the enclosures as by bolts 552. When using two of the baggers 500 as a unit, the height thereof will be adjusted in a manner described for adjusting one bagger.

After a single bagger 500 or two baggers 500 as a unit are adjusted to proper height, it is securely attached to the conveyor. To accomplish such attachment, the chute floor 534 of each bagger is disposed in one of the discharge openings 504 of the conveyor side 505 to bring the floor lip 535 closely adjacent the edge of the conveyor belt 502. When the floor is in such a relation to the side of the conveyor, the chute channels 536 will be adjusted in position on the columns 518 to dispose the webs 537 in suitably spaced relation (FIG. 23).

The channels 536 are formed, at their front ends, with obliquely disposed corners 553 which provide the article delivery chute 533 with a flaring entrance. The front flange 538 of each of the channels 536 is provided with a horizontal slot 554 for purposes of adjustably attaching the chute to the side 505 of the conveyor at opposite sides of the opening 504. A bolt 555 (FIG. 23) in the conveyor side 505 at each side of the opening 504 is disposed in the slot 554 of each front flange of the channels.

An article control gate 556 is disposed adjacent the front of the plate 523 which extends between the tops of the columns 518. For the purpose of pivotally mounting the gate 556 in the bagger 500, the plate 523 is provided with two bearing blocks 557 (FIG. 23). It will be noted that the front edge of the plate 523 is recessed between the bearing blocks 557 to permit unrestricted movement of the gate. The blocks 557 are provided with aligned apertures 558 in which the shaft 559 of a crank 560 is disposed for pivotal movement. At one end of the crank shaft 559 is an arm 561 which is pivotally interconnected by means of a link 562 with an armature 563 of a gate actuating solenoid 564 fixedly mounted on the plate 523 within the box-like enclosure 525.

The gate 556 comprises a horizontal sleeve 566 to which a plurality of substantially equally spaced studs 567 are fixed throughout the length of the sleeve. The studs project perpendicularly from the sleeve. A short length of resiliently flexible tubing 568 of rubber or plastic is frictionally disposed on each of the studs 567 to form gate fingers 569. Certain ones of the fingers 569 may be removed from or disposed on the studs 567 to change the effective width of the gate. The gate 556 is arranged in its operating position in the chute by manually pivoting the sleeve 566 until the fingers 569 are obliquely disposed as in FIG. 21. The solenoid 564 is then energized and the sleeve 566 is secured to the shaft 559 as by a set screw 570 (FIG. 23). Thus, when the solenoid 564 is deenergized, the gate will be disposed in the closed position of FIG. 23.

The article control gate 556 is pivoted into closed or article arresting position in the article delivery chute by means of a spring 571 which is provided in the box-like enclosure 525 and disposed under tension between the rear wall of the box-like enclosure 525 and an arm 572 on the sleeve 566. Upon energization of the solenoid 564, the gate will be opened (FIG. 21) against the resilient force of the spring 571.

Referring now to FIG. 22, the electrical control system for the bagger 500 comprises a main circuit 572 and two branch circuits 573 and 574. The circuit 572 extends between electrical service leads 575 and 576. Since the purpose and function of the hopper switch 418 and the weight switch 452 of the electrical system of the FIG. 1 bagger has been well established in describing the bagger 30 and since switches for identical purpose and function are used in the circuit 572 of the bagger 500, the number 418*a* will be given to the hopper switch and the number 452*a* will be given to the weight switch of the bagger 500 in describing the electrical system. A relay S in the circuit 572 has two sets of normally open contactors S1 and S2. One set of contactors S1 is disposed in the branch circuit 573 in series with the gate actuating solenoid 564. The remaining set of contactors S2 is in the branch circuit 574 which acts to establish a holding circuit for the relay S. A main switch 580 is arranged in the system between the leads 575 and 576 and supply lines L1 and L2 of a source of suitable electrical energy (not shown).

Throughout the present portion of the description directed to the bagger 500, the operation thereof has been given concurrently with a detailed description of the structure. Since it only remains to coordinate the function of the electrical system with the operation of the various mechanical components of the present bagger, this will be dealt with in the following operational description.

To place the bagger 500 in operation, the attendant first installs the correct weights 440*a* on the rod 438*a* at the forward end of a balance beam 429*a* of the weighing machine F*a* in order to compensate for the weight of the hopper E*a* and for the desired weight of articles to be put in each bag. The channel sections 536 forming the sides of the article delivery chute 533 are adjusted to provide a chute of suitable width to accommodate the same to whatever produce is to be bagged. Certain of the fingers 569 are either installed on or removed from the studs 567 on the finger assembly 569 of the gate 556 to accommodate the same to the width of the chute 533. The conveyor 501, which is in operation, is supplied with articles of produce such as potatoes. Thereafter, the switch 580 of the electrical system (FIG. 22) is closed and the bagger 500 is in operation.

It will be recalled that the normally open hopper switch 418*a* in the circuit 572 is held closed by the arm 424*a* (FIG. 21) of the hopper E*a* when the hopper is in article receiving condition, and that the normally closed switch 452*a* in the same circuit remains closed until the hopper comes to weight. The above described manner of operating the switches 418*a* and 452*a* assures that the relay S, associated with the switches, will be immediately energized as soon as the main switch 580 is closed. Therefore, the normally open contactors S1 and S2 in the branch lines 573 and 574 will be closed as soon as the relay S is energized. Closing of the contactor S1 in the branch line 573 establishes a closed circuit and energizes the gate solenoid 564. Closing of the contactor S2 establishes a holding circuit to keep the relay S energized.

When the gate 556 is opened by energization of the gate solenoid 564, articles carried along by the conveyor belt 502 are discharged therefrom through the flaring entrance of the chute 533 and are conducted by the chute to the hopper E*a* in a manner previously described. The oblique front corners 553 of the chute channels 536 prevent injury to the produce as the same enters the chute.

When a predetermined weight of articles has been delivered to the hopper so as to tilt the rear end of the balance beam 429*a* downwardly against the action of the counterbalance weights 440*a*, the hopper E*a* has been lowered a predetermined distance. Such action is effective to open the switch 452*a* in the circuit 572 and deenergize the relay S, even though the hopper switch 418*a* is still held closed by the arm 424*a*. When the relay S is deenergized, the contactors S1 and S2 (FIG. 22) thereof are returned to their normally open position and the gate solenoid 564 is deenergized and the gate is closed by the previously described spring 571 (FIG. 23). When the gate 556 is closed, further delivery of articles to the hopper Ea is stopped.

The attendant, having put the open end of a bag about the mouth 366a of the hopper Ea, pivots the hopper to discharge the produce from the hopper as previously explained. Tilting of the hopper pivots the arm 424a out of engagement with the switch actuator to thereby open the switch 418a as the potatoes slide from the hopper Ea into the bag.

Before the hopper is pivoted counterclockwise about rods 381a to return the same to article receiving condition (FIG. 21), the attendant releases his grip on the hopper. Thereafter, the hopper as raised by the counterweights 440a and the weight switch 452a of the circuit 572 is permitted to close. When the hopper is pivoted counterclockwise, the switch 418a is closed. Both the weight switch 452a and the hopper switch 418a are now closed. Accordingly, the relay S is energized, and as previously explained, the gate 556 is raised so as to initiate another bag filling operation.

Because of the frequency with which both apples and oranges are bagged and the special problems relating to the bagging of each, two special purpose hoppers, for use with the bagger of the present invention, have been developed to fill this need.

A hopper 582 (FIGS. 24, 25, 26 and 27) is adapted to handle apples and can be mounted in the U-shaped bracket 382 (FIG. 6) of bagger 30 and may be successfully used with any form of the present bagger. In describing the apple hopper 582, any necessary reference to hopper mounting structure will be by use of the same reference numerals as originally used in connection with the bagger 30.

Figures 24, 25:
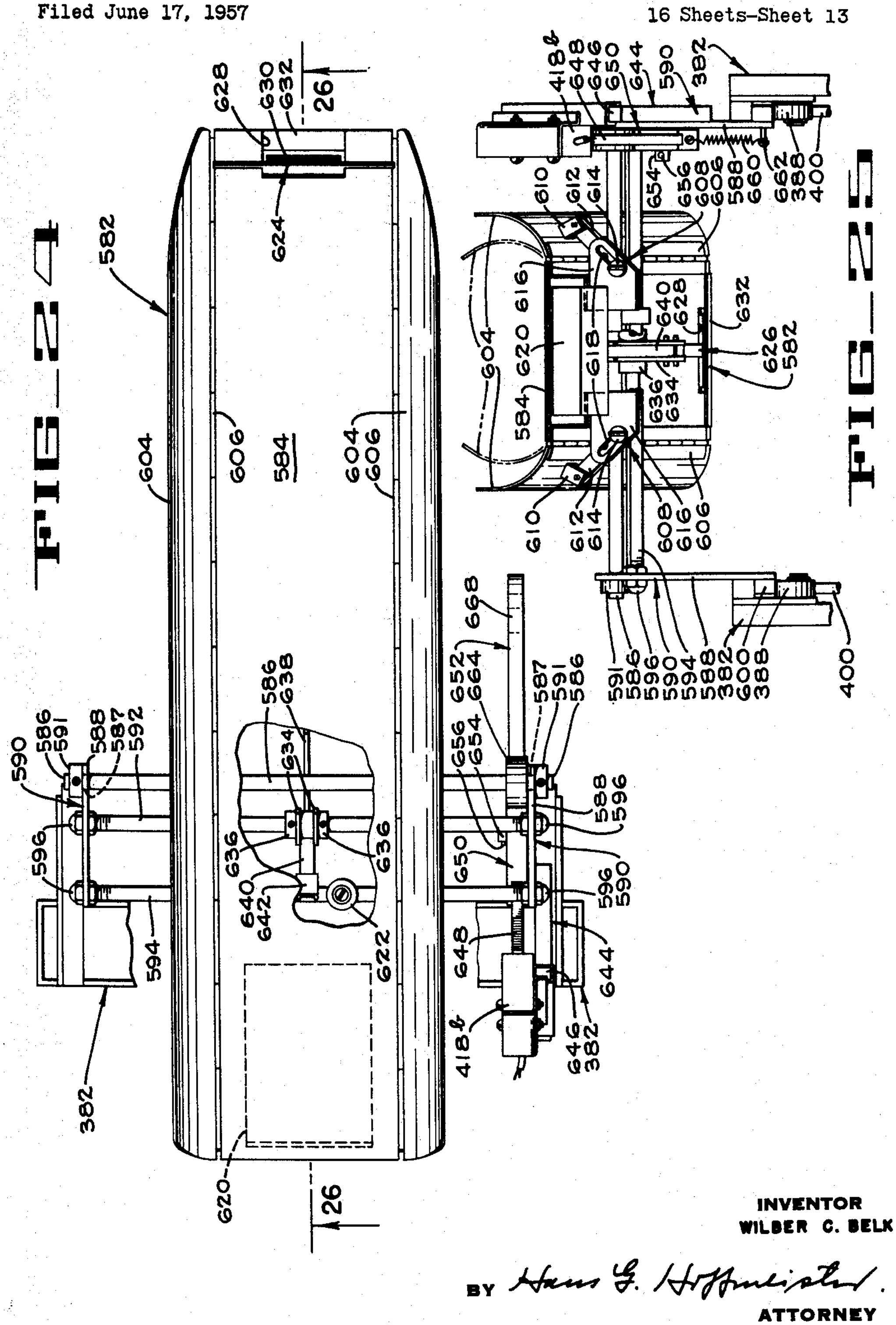
FIG. 24 is a plan, with parts broken away, of a modified form of article hopper.
FIG. 25 is a fragmentary end elevation of the hopper shown in FIG. 24.

Referring to FIGS. 24 and 25, the hopper 582 comprises a floor 584 which is fixedly attached as by welding to the top surface of a pivot rod 586. The rod 586 is disposed transversely of the hopper and is pivotally received adjacent its ends in suitable apertures 587 (FIG. 24) in upstanding mounting plates 588 (FIG. 25) of two hopper slide assemblies 590, one of which is disposed at each side of the hopper. A set collar 591, affixed to each end of the hopper pivot rod 586 outwardly of the plates 588, holds the hopper 582 against lateral movement axially of the rod relative to the slides 590. Two transverse struts, including a rearward one 592 (FIG. 24) and a forward one 594, are disposed forwardly of the pivot rod 586 and extend between the slide plates 588. The struts 592 and 594 are detachably secured to the slide plates 588 by means of nuts 596 to hold the plates in spaced relation as well as to provide mounting means for other components of the hopper structure. Each of the two plates 588 of the two slide assemblies 590 is provided, adjacent its bottom edge, with a slide bar or feather 600. Each slide bar comprises a length of square-section bar stock that is disposed horizontally along the bottom of the outer face of the associated plate 588.

The hopper floor 584 is provided along its lateral edges with elongated, outwardly bowed side walls 604. It will be noted (FIG. 25) that the walls 604 and the floor 584 are pivotally interconnected along their adjacent edges by means of elongated hinges 606. Forwardly of the strut 592 each hopper side wall 604 is provided with an adjustment mechanism 608 (FIGS. 25 and 26) by which the angular position of the walls 604 can be adjusted. Each adjustment mechanism 608 comprises a clevis 610 which is fixedly secured to the undersurface of the associated side wall 604. A link 612 is pivotally disposed at one end in each clevis 610 and at its other end is slidably attached by a screw 614 to a bracket 616 which is secured to the undersurface of the hopper floor 584. The shank portion (not shown) of the thumb screw 614 is disposed in an upwardly and outwardly inclined slot 618 of the bracket 616. In order to change the position of the hopper side walls, the thumb screws 614 are first loosened. The positions of the walls are then adjusted whereupon the links 612 are moved so as to slide the thumb screws 614 along the slots 618 to new locations. Thereafter the thumb screws 614 are tightened in order to retain the hopper sides in adjusted position.

The hopper which, by virtue of the rod 586, is pivotally disposed between the slides 590 is provided with a counterweight 620 (FIG. 26) at the front end thereof which is attached in any convenient manner to the underside of the hopper floor 584. The counterweight 620 provides a force tending to rotate the hopper in a counterclockwise direction. A resilient stop 622 (FIG. 27) is provided on the upper surface of strut 594. The undersurface of the hopper floor 584 engages the stop 622 to prevent further rotation of the hopper 582, in a counterclockwise direction under the influence of the counterweight 620 beyond the position shown in FIG. 26.

At the rear end of the hopper 582 is a gate 624 that is disposed transversely of the hopper floor 584 to which it is pivotally attached in a well known manner. The gate 624 substantially closes the space between the side walls 604 at the discharge end of the hopper in order to block the exit of articles therefrom when in article receiving condition. However, when it is desired to discharge articles from the hopper and the gate is moved in a clockwise direction (FIG. 27), suitable gate control linkage 626 becomes effective to fully retract the gate.

The gate 624 is pivoted on the floor 584 at the front end of a notch 628 (FIG. 24) at the discharge end of the hopper 582. It will be noted that an arm 630 (FIG. 26) is provided on the outer side of the gate. The free end of the arm 630, which is offset from the gate rearwardly of the hopper, is narrower than the notch 628 and projects therethrough below the hopper floor. At the rear end of the floor 584 a strap 632, which is spaced below the floor, extends across the notch 628 to interconnect the edges of the floor at opposite sides of the notch. When the gate 624 is swung to fully open position (not shown) beyond the FIG. 27 position, the above-described construction permits the gate to lie substantially in the plane of the floor.

A lever arm 634 (FIG. 26), of the gate control linkage 626, is pivotally disposed centrally of the strut 592 on which it is retained against axial displacement by set collars 636 (FIG. 24). Extending rearwardly of the lever arm 634 is an elongated link 638 which pivotably interconnects the lever arm 634 with the offset arm 630 of the gate. Extending forwardly of the lever arm 634 is a relatively short link 640 which pivotably interconnects the arm 634 with a clevis 642 which is affixed to the underside of the hopper floor 584. It will be noted that the longer link 638 is bent so as to closely underlie the floor throughout substantially its entire length. Adjacent the pivot rod 586, however, the link 638 is angled downwardly toward the lever arm 634. Bending the arm permits the open end of a bag (not shown) to be readily slipped over the discharge end of the hopper 582, yet does not cause interference between the link 638 and the arm 634 during movement of the hopper to discharge position. The above-described arrangement of pivotally mounting the lever arm 634 on the strut 594, which is located eccentrically to the hopper pivot rod 586, causes the gate 624 to be pivoted from the hopper-blocking position of FIG. 26, to and beyond the position shown in FIG. 27 to a position in which the gate is fully opened, when the hopper is pivoted on the rod 586 to its discharge position.

Figures 26, 27:
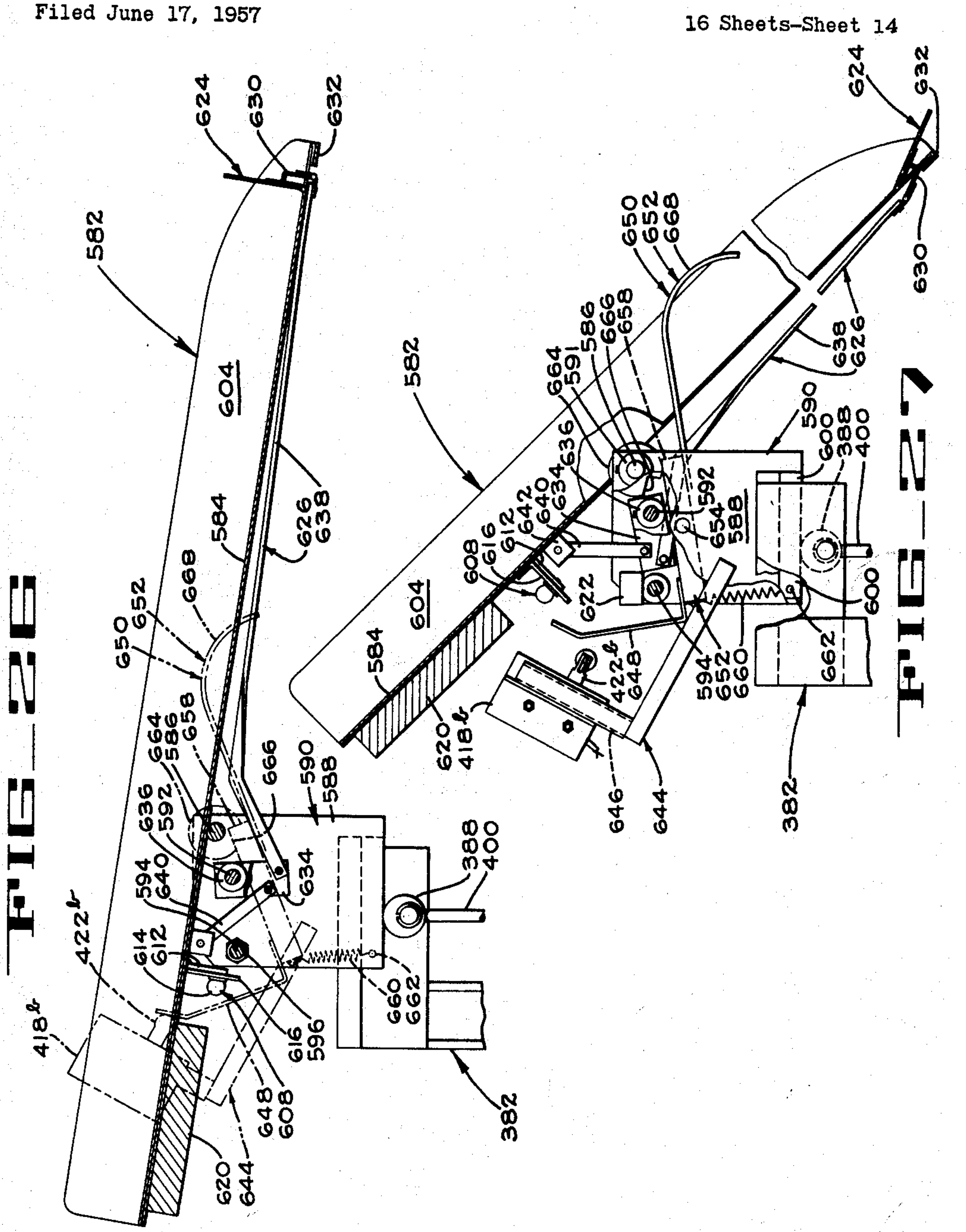
FIG. 26 is a longitudinal vertical section taken along line 26—26 of FIG. 24.
FIG. 27 is a view similar to FIG. 26 showing the hopper approaching discharge position, certain parts being broken away and other parts being shown in elevation.

It will be noted (FIGS. 24, 26 and 27) that a switch mounting bracket 644 is rigidly affixed to the outer face of the right-hand hopper slide 590 with a leg 646 inclined upwardly and rearwardly of the hopper 582 to support a switch 418b which is identical to the previously described switch 418. When the hopper 582 is mounted upon the U-shaped bracket 382, the switch actuator **422*b* is disposed adjacent an arm 648 of a hopper lock 650 (FIGS. 26 and 27). The hopper lock 650 retains the hopper 582 in apple receiving condition (FIGS. 24, 25 and 26), in which condition the normally open switch 418*b* is held closed by engagement of the arm 648 with the switch actuator 422*b* (FIG. 26). When the hopper is full and the lock 650 is released by the attendant, the hopper will pivot to discharge its contents (FIG. 27). Movement of the arm 648 of the hopper lock 650 releases the actuator 422*b* so that the switch 418*b*** is returned to open condition.

The hopper lock 650 comprises a lever 652 which is pivotally disposed on a stud 654 upon the inner side of the right-hand slide 590 (FIG. 25). Movement of the lever axially off the stud 654 is prevented by a suitable pin 656. Rearwardly of the stud 654, the lever 652 is formed with an outside corner 658. Forwardly of the stud 654 the arm 648 is secured to the lever 652 and a tensile spring 660 is attached under tension between the lever 652 and a pin 662 which is located at the bottom of the right-hand slide 590 (FIG. 25). The spring urges the lever 652 in a counterclockwise direction (FIGS. 26 and 27) into yielding engagement with a ratchet wheel 664. The ratchet wheel 664 is rotatably adjustable upon the hopper pivot rod 586 and is in vertical alignment with the lever 652. A single notch 666 having the two sides disposed substantially normal to each other, is provided in the periphery of the ratchet wheel 664 for cooperation with the outside corner 658 of the lever 652.

When the hopper 582 is in article receiving condition (FIGS. 24 and 26), with the floor 584 of the hopper held in engagement with the bumper 622 by means of the counterweight 620, the ratchet wheel 664 is rotatably adjusted on the rod 586 to bring the notch 666 therein into mating engagement with the corner 658 of the lever 652. The ratchet wheel 664 is then secured to the rod 586, in any convenient manner, against axial or rotary displacement. The tensile spring 660 yieldably retains the lever 652 with the corner 658 thereof in the notch 666 of the ratchet wheel 664 to act as a pawl for removably retaining the hopper in article receiving condition, as may best be understood from FIG. 26. While the lock 650 is in the above-described position, the arm 648 thereof holds the actuator **422*b* of the hopper switch 418*b*** depressed so that the switch is closed.

When the apple hopper 582 is to be put into operation, it is mounted on the U-shaped bracket 382 of the machine and is pivoted to the apple-receiving position of FIG. 26.

Upon delivery of a predetermined weight of apples to the hopper 582 by the bagger, the conveyor is stopped by the downward movement of the hopper as explained in connection with hopper E. Thereafter, the attendant disposes the open end of a bag (not shown) over the rear end of the hopper. In order to discharge the apples from the hopper 582 into the bag the attendant trips the lock 650 by depressing a handle 668 on the lever 652 to thereby remove the pawl 658 from the notch 666 of the ratchet wheel 664 as he simultaneously presses downwardly on the discharge end of the hopper. Tripping of the lock 650 releases the ratchet wheel 664, permitting the hopper 582 to pivot in a clockwise direction (FIG. 26) with the rod 586. When the lock 650 is tripped, the lever arm 648 releases the switch actuator **422*b* so that the switch 418*b* is opened. The swinging action of the hopper is effective to move the gate 624 from the closed position (FIG. 26) to and beyond the position shown in FIG. 27, by means of the gate control linkage 626. Upon opening of the gate 624, when the hopper is disposed in substantially vertical position, the bag is moved downwardly by the attendant, and off of the hopper. In so doing, the apples are smoothly moved downwardly of the hopper and are transferred to the bag without possibility of damage to the fruit. Thereafter, the hopper is moved in a counterclockwise direction from the vertical position (not shown), through the FIG. 27 position and to the FIG. 26 position by the action of the counterweight 620**.

After the lock 650 is tripped to release the hopper from article receiving condition, the pawl 658 is drawn into engagement with the periphery of the ratchet by the lock spring 660. When so disposed, the pawl does not prevent pivoting of the apple hopper 582 but is ready to enter the notch 666 at the instant the hopper returns to article receiving condition. Counterclockwise rotation of the hopper restores the gate to extended position and the lock lever 652 is moved by the spring 660 to dispose the pawl 658 in the notch 666 of the ratchet wheel. When the lock 650 is set, the hopper is retained in article receiving condition and the switch 418 is closed by the arm 648.

All features of the apple hopper 582 contribute to rapid and damage-free bagging of apples. The manner in which the side walls 604 are smoothly bowed throughout their length assures that whether the walls are adjusted to be closely or widely spaced, they present no obstruction upon which the apples can be damaged. If it is desired to change the weight of the apples to be bagged the area of the hopper can be changed accordingly by adjusting the side walls 604.

The shallow angle at which the hopper is disposed when in article receiving condition (FIG. 26) assures that all apples will roll gently thereinto without being bruised. At the time of discharge, the complete retraction of the gate 624 so that only a smooth hopper floor remains, further adapts the hopper 582 for handling such easily damaged articles as apples.

In the operation of bagging oranges or any of the larger citrus fruit, it is advantageous to place the fruit in the bag directly, one or two at a time, rather than to discharge a pre-weighed quantity of fruit at one time into a bag. In the present invention, a hopper 680 (FIG. 28) is arranged to guide the fruit directly into a bag 681 which is supported by a platform 682. The platform is carried by the structure that mounts the hopper on the U-shaped bracket 382 of the machine. Accordingly, as the weight of the oranges in the bag increases, the platform 682 and the hopper 680 move downwardly together to actuate the scale switch.

Figures 30, 31, 32:
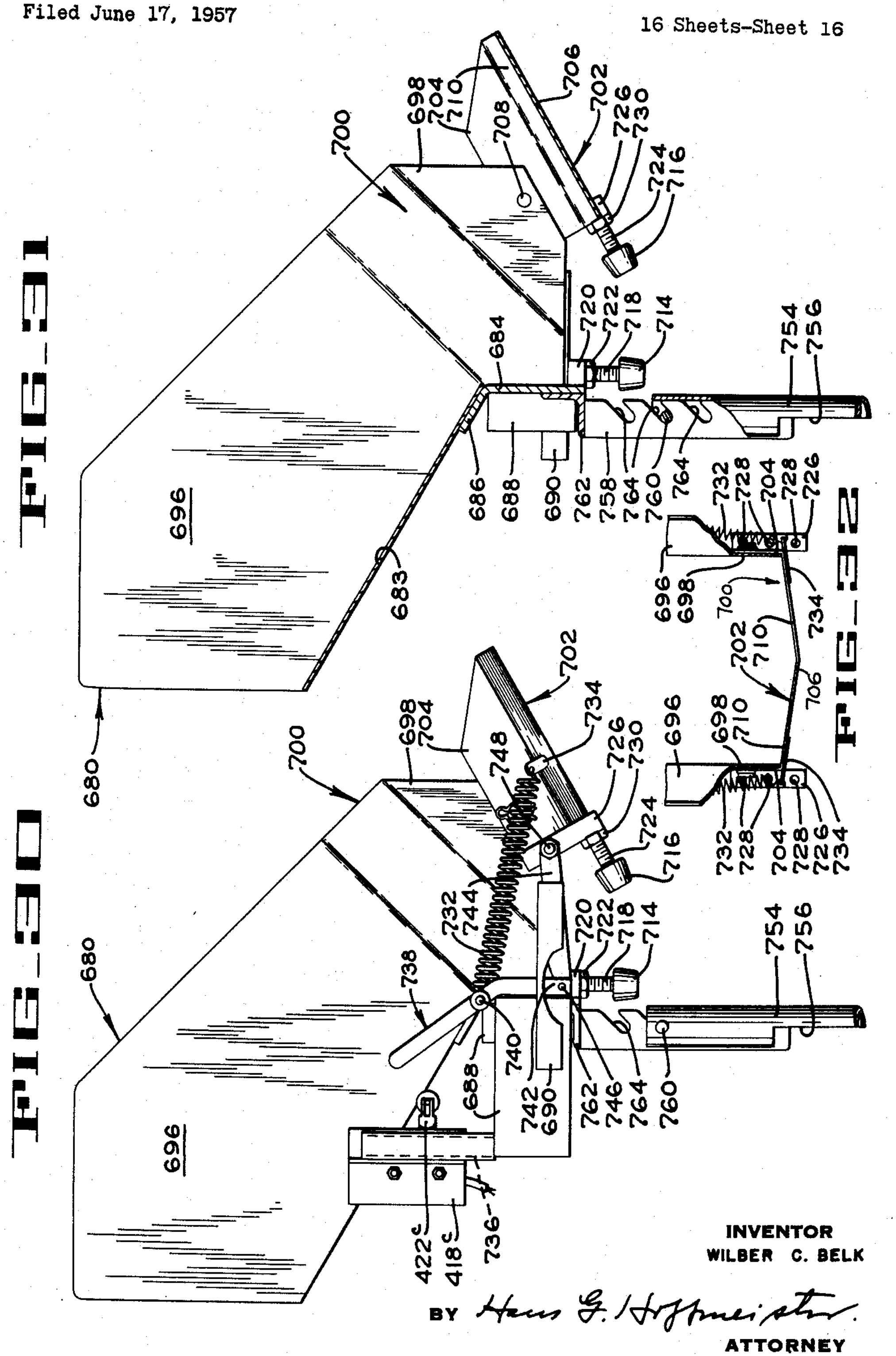
FIG. 30 is a side elevation of the hopper of FIG. 28, showing the same in a different operative position.
FIG. 31 is a vertical longitudinal section taken along the line 31—31 of FIG. 29, showing the hopper in the position shown in FIG. 30.
FIG. 32 is a fragmentary horizontal section, the view being taken along line 32—32 of FIG. 28.

Referring to FIG. 31, the hopper 680 comprises a downwardly and rearwardly inclined floor 683 which is fixedly attached to a flat support member 684 by means of a forwardly directed lip 686. The member 684 is disposed transversely of the hopper and is formed adjacent its ends with vertically disposed plates 688 that extend forwardly from the member 684. The plates 688 are each provided, adjacent their bottom edge, with a slide bar or feather 690 (FIG. 30). Each slide bar comprises a length of square-section bar stock that is disposed horizontally along the bottom of the outer face of the associated plate 688. The plates 688 with the slide bars 690 thereon, comprise the two slides which are received in the guideways of the bracket 382 of the machine.

Figures 28, 29:
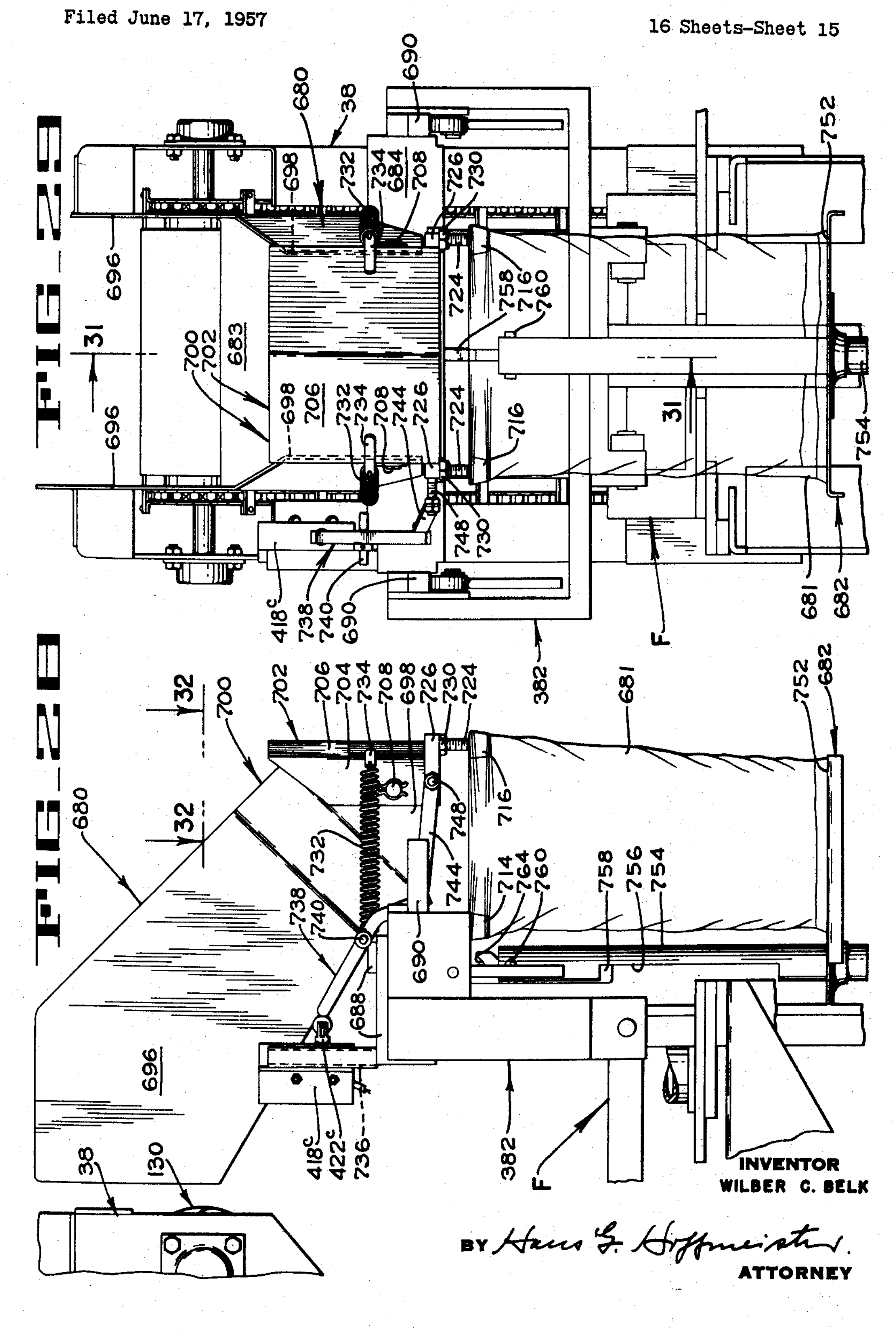
FIGS. 28 and 29 are fragmentary side and rear elevations, respectively, of an article handling apparatus, particularly showing another modified form of article hopper.

As best shown in FIGS. 29 and 31, the hopper floor 683 is provided along its lateral edges with side walls 696. At the rear end of the floor 683 (FIG. 31) the walls 696 converge (FIGS. 29 and 32) and are formed with parallel panels 698 which are spaced inwardly of the hopper from tne lateral edges of the floor 683 to provide the hopper 680 with a mouth 700 of restricted transverse dimension. The edges of the panels 698 at the rear of the hopper are disposed vertically throughout a major portion of their length.

As best shown in FIGS. 29, 31 and 32, an end wall 702 of modified channel shape, having side flanges 704 that are interconnected by a transversely disposed web 706, is provided to close the rear end of the hopper. The flanges are suitably apertured (not shown) in order to pivotally mount the wall 702 on laterally extending studs 708 that project outwardly from the panels 698. It will be noted that the web 706 (FIG. 32) is in the form of a shallow V, providing the end wall 702 with two converging deflector surfaces 710 interiorly of the hopper. When mounted as above described, the end wall is free to swing about the studs 708 between the positions shown in FIG. 28 and in FIG. 30. The lower rear corner of the panels 698 and the upper front corners of the side flanges 704 are cut away in order to prevent interference between the hopper and the end wall 702 during movement of the same.

The present orange hopper 680 is arranged to hold open the bag 681 (FIG. 28) into which the oranges are deposited directly. For this purpose, two knobs 714, which are aligned transversely of the hopper, are provided on the support member 684 below the hopper mouth 700 and two transversely aligned knobs 716 are provided on the flanges 704 of the end wall 702. The knobs 714 are attached to the hopper by means of shanks 718 which are threadedly disposed in blocks 720 (FIG. 31) that are suitably secured to the before mentioned hopper mounting member 684. Vertical adjustment of the knobs 714 may be made in a well known manner, after which they are locked in the adjusted position by lock nuts 722.

The knobs 716 are mounted by means of shanks 724 (FIGS. 30 and 31) in elongated blocks 726 that are suitably attached to the outside of the side flanges 704 at the bottom thereof. It will be noted (FIG. 32) that the blocks 726 which extend longitudinally of the hopper are each provided with a series of three spaced holes 728. In order to attach the two knobs 716 to the end wall 702, the shanks 724 are threadedly disposed in a pair of the holes 728 which are arranged in alignment transversely of the hopper. After suitable vertical adjustment of the knobs 716, a lock nut 730 on each of the shanks 724 is employed in a well known manner to retain the knobs 716 in position. The remaining pairs of transversely aligned holes 728 in the blocks 726 are employed when the knobs 716 are to be moved relative to the knobs 714 so as to accommodate the spacing of the knobs 714 and 716 to bags of different diameter.

The end wall 702 of the hopper may be pivoted about the studs 708 from the position of FIG. 28 into the position shown in FIG. 30, wherein the knobs 716 are moved closer to the knobs 714, with the shanks 724 disposed at an oblique angle so that the open end of the bag 681 can be easily placed about the knobs 714 and 716 or removed therefrom. In order to yieldably retain the end wall 702 in either the FIG. 28 or the FIG. 30 position, two tensile springs 732 are provided. The springs 732 are disposed at opposite sides of the hopper 680 and are stretched between the support member 684 at one end and spring attaching tabs 734 (FIG. 32) on the web 706 of the end wall 702 at the other.

A hopper switch **418*c* (FIG. 28) which is identical to the previously described switch 418, is slidably disposed on a suitable bracket 736 that projects vertically from the slide plate 688 at the left side (FIG. 29) of the orange hopper 680. The switch 418*c* is held closed when the hopper is in article receiving condition. A lever 738, provided for this purpose, is pivotally mounted by means of a pivot pin 740 adjacent the left hand end of the member 684 (FIG. 29). The lever 738 is formed so that when the rear end 742 thereof (FIG. 30) lies substantially flat against the support member 684, the other end of the lever will be released from engagement with the actuator 422*c* of the switch 418*c*. The lever 738 is operatively interconnected with the rear end wall 702 by means of a link 744 (FIG. 29) which is pivotally attached to the rear end 742 of the lever by means of a pin 746, and to a stud 748 on the block 726 on the adjacent flange 704. When the lever 738 lies with its end 742 against the member 684 (FIGS. 30 and 31), the knobs 716 are disposed adjacent the knobs 714**.

It will be noted from FIGS. 28 and 30 that the springs 732 are attached to the end wall 702 at such a point as to have an over center action when the end wall is pivoted about the studs 708. Such action assures that the bag 681 will be held securely in place when the end wall 702 is drawn by the springs 732 against the rear edge of the panels 698 (FIG. 28). Under such a condition, the rear end of the spring 732 will be disposed above the studs 708 (FIG. 28) and the link 744 will pivot the lever 738 into engagement with the switch actuator **422*c* and close the switch 418*c*. When the end wall 702 is moved by an attendant so that a bag may be removed from or attached to the hopper 680, the rear ends of the springs will be disposed below the studs 708 to yieldably retain the end wall 702 in a position in which contact of the end 742 of the lever 738 with the member 684 holds the end wall in the FIG. 30 position. At the same time, the lever 738 is held out of engagement with the switch actuator 422**.

While the bag 681 is held open by the knobs 714 and 716, it is not practical to support the entire weight of a bag filled with oranges by the knobs. Therefore, the table or platform 582 is provided below the hopper mouth 700 and is arranged to receive the bottom of the bag 681. In order that the table 682 can move with the hopper 680, as oranges entering the bag lower the hopper in the associated weighing machine F, the table 682 is dependently attached to the rod support member 684.

As best seen in FIGS. 28, 29 and 31, the platform 682 comprises a flat plate 752 large enough for the bottom of the bag 681 to rest upon. The plate 752 is attached in any convenient manner adjacent its front end to a vertical tube 754 and projects in cantilever fashion from the lower end of the tube. It will be understood from FIGS. 28 and 31 that the wall of the tube at the front thereof is provided with a vertical opening 756 which is open at the top of the tube. The upper part of the opening 756 is in the form of a narrow slit, the walls of which fit closely adjacent each side of a tongue 758 that extends downwardly from the hopper support member 684. At the upper end of the tube 754 is a pin 760 that extends transversely across the tube.

It is the purpose of the tongue 758 to suspend the table 682 as may be seen in FIG. 28. The tongue 758 is rigidly affixed to an angle bracket 762 that is in turn secured to the front side of the support member 684. The tongue is of a width corresponding closely to the width of the upper part of the opening 756 in the tube 754 and is provided in its rear edge with a series of upwardly and rearwardly inclined notches 764. Referring to FIG. 31, the table is hung from the hopper 680 by disposing the pin 760 of the tube 754 in a suitable one of the notches 764 in the tongue.

When the hopper 680 is suitably positioned in the U-shaped bracket 382 of the machine, a bag 681 is disposed about the knobs 714 and 716 in a manner previously described. The end wall 702 is moved to a vertical position (FIG. 28) so that the switch actuating lever 738 will be brought into position against the switch actuator **422*c* to close the switch 418*c*. Next, the spacing of the table 750 from the hopper is adjusted by disposing the pin 760 in a suitable one of the notches 764 in the tongue 758. The recess 756 in the forward wall of the tube 754 provides clearance between the tube and the weighing machine F (FIG. 28) when the hopper 680** is suitably positioned adjacent the bagger.

During delivery of oranges to the hopper 680, because of the relatively large size of the fruit, only one or two oranges enter the hopper at a time. In entering the hopper, the oranges roll down the floor 683 thereof and against one or the other of the deflector surfaces 710 (FIG. 32) of the end wall 702.

Upon delivery of a predetermined weight of oranges to the hopper 680 by the bagger, as previously explained, further delivery of oranges to the hopper is discontinued. Thereafter, the attendant, by grasping the top edge of the end wall 702, pivots the same into the position shown in FIG. 30 which is effective to open the switch **418*c* by disengagement of the lever 738 therewith. The open upper end of the bag 681 is released from the knobs 714 and 716 so that the entire weight of the filled bag rests upon the table 682. The attendant then removes the filled bag from the table 682, places an empty bag with its open, upper end about the knobs 714 and 716, and returns the end wall 702 to the position shown in FIG. 28. The return of the end wall to the above-described position indicates an article receiving condition of the hopper, in which condition the switch 418c** is closed.

In resume, the improved conveyor construction of the present bag filling apparatus particularly adapts the same to use in such places as supermarkets. The precise weight of articles measured during each weighing operation results from the novel construction and operation of the discharge control roller at the discharge end of the conveyor. The pocket lifter roller of the present apparatus provides a completely new arrangement for reducing the capacity of each conveyor pocket to a predetermined volume, and it is particularly effective when articles of a small size are to be weighed. Damage-free operation of the present bagger apparatus results largely from the novel hoppers which are especially designed and adapted to safely handle certain articles of produce.

It is to be understood that, while a specific structure of the present invention has been illustrated in the drawings, the invention is not to be limited thereby since various changes and modifications may be made in the details of the apparatus without departing from the spirit and scope of the appended claims.

Having thus described the invention, what is claimed as new and desired to protect by Letters Patent is:

1. In an article bagging apparatus, a movable conveying member having a plurality of flexible depending loops defining pockets arranged to contain articles, and a discharge control member mounted below the conveying member and arranged to successively engage laterally spaced parts of the underside of each loop as said conveying member moves over said control member to successively lift articles in the portions of the pockets above said spaced parts of the loops.

3. In an article bagging apparatus, a flexible conveying member having a plurality of loops defining depending pockets arranged to contain articles, and a roller mounted below said conveying member and arranged to successively engage and flatten separate laterally spaced parts of each loop to discharge articles successively from the portions of the pocket defined by said spaced parts of each loop.

3. In an article bagging apparatus, a movable conveying member with a plurality of flexible depending loops defining pockets arranged to contain articles, loop engaging means disposed below said conveying member and operable to engage and lift upwardly the bottom wall of each loop to reduce the capacity of the pocket a predetermined amount, and a discharge control member spaced from said loop engaging means in the direction of movement of said conveying member and mounted below said conveying member, said control member being arranged to successively engage laterally spaced parts of the bottom wall of each loop as said conveying member moves over said control member to successively lift said spaced parts of each loop and move each loop upwardly out of depending condition.

4. In an article bagging apparatus, a flexible conveying member having a plurality of material carrying pockets of predetermined volume, pocket engaging means disposed below said conveying member and operable to engage each pocket to temporarily reduce the capacity of each pocket a predetermined amount thereby discharging all but a predetermined volume of material from each pocket, and a roller disposed below said conveying member and spaced in the direction of movement of said conveying member from said pocket engaging means and operable upon movement of said conveying member thereover to gradually engage and flatten each pocket to successively eliminate the pockets.

5. In an article bagging apparatus, a flexible conveying member having a plurality of loops defining depending pockets, loop engaging means disposed below said conveying member and operable to engage and lift each loop to reduce the capacity of the pocket a predetermined amount, and a roller disposed below said conveying member and spaced in the direction of movement of said conveying member from said loop engaging means, and means defining longitudinally spaced recesses in the outer surface of said roller, said roller being operable upon movement of said conveying member thereover to successively engage and flatten laterally spaced parts of each loop to discharge articles successively from said spaced parts of each loop.

6. In an article bagging apparatus, a support structure, an article storage bin mounted adjacent one end of said structure, a drive shaft rotatably disposed in said structure adjacent said bin, a flexible conveying member having a plurality of loops defining depending pockets movable through said bin to remove articles therefrom, an article agitator mounted for vibrating movement in said bin, said drive shaft being connected in driving relation with said conveying member and with said agitator, pocket engaging means disposed below said conveying member in position to be engaged by each pocket whereby each pocket is raised a fixed distance to displace all but a predetermined amount of articles therefrom, a discharge control roller mounted below said conveying member and operable to successively engage laterally spaced parts of the lower wall of each loop to successively lift each spaced part to eject articles from each pocket, a power transmission, and transmission engaging means arranged upon actuation to connect said transmission in driving relation with said drive shaft.

7. In a bagging machine, a conveyor discharge roller comprising a body of fragmentary cylindrical form having two diametrically opposed fragmentary cylindrical surfaces, and means defining a recess in each surface extending longitudinally of said body from a point adjacent the longitudinal midpoint of the body to one end of the body, the recess in one surface being disposed adjacent the opposite end of said body from the recess in the other surface.

8. In a bagging machine, a conveyor discharge roller comprising a body of fragmentary cylindrical form having a plurality of equally spaced fragmentary cylindrical portions extending from end to end thereof, means providing a face between said cylindrical portions disposed in parallel relation to the axis of said body, and means defining a recess in each of said portions of the body extending longitudinally of the body.

9. In a bagging machine, a conveyor discharge roller comprising a body of fragmentary cylindrical form having a plurality of equally spaced fragmentary cylindrical portions extending end to end thereof, means providing a face disposed between each two adjacent portions, and a step extending a limited distance longitudinally of said body in each of said fragmentary cylindrical portions, each of said steps having two surfaces forming a ridge along their contiguous edges.

10. In a bagging machine, a conveyor discharge roller comprising a body of fragmentary cylindrical form having peripherally spaced fragmentary cylindrical portions extending from end to end along said body, means providing a flat face extending longitudinally of said body between said peripherally spaced cylindrical portions, and a step in each cylindrical portion extending a limited distance longitudinally of said body, each step having two surfaces forming a ridge along their contiguous edges and having one of said surfaces intersect said face at an acute angle thereto.

(References on following page)

References Cited in the file of this patent

UNITED STATES PATENTS

| | | |
|---|---|---|
| 352,925 | Mathews | Nov. 23, 1886 |
| 626,232 | Honstain et al. | June 6, 1899 |
| 1,039,499 | Donald et al. | Sept. 24, 1912 |
| 1,176,222 | Klinger | Mar. 21, 1916 |
| 1,550,803 | Harbison | Aug. 25, 1925 |
| 1,575,233 | Stillman | Mar. 2, 1926 |
| 1,850,637 | Schiff | Mar. 22, 1932 |
| 1,878,348 | Te Selle | Sept. 20, 1932 |
| 1,914,708 | Baden | June 20, 1933 |
| 2,016,443 | Levitre | Oct. 8, 1935 |
| 2,022,659 | Fisher | Dec. 3, 1935 |
| 2,181,661 | Lowry | Nov. 28, 1939 |
| 2,311,347 | Orstrom | Feb. 16, 1943 |
| 2,463,811 | Schulze | Mar. 8, 1949 |
| 2,466,386 | Curioni | Apr. 5, 1949 |
| 2,525,225 | Karlovick | Oct. 10, 1950 |
| 2,614,786 | Caron et al. | Oct. 21, 1952 |
| 2,670,921 | Dodd et al. | Mar. 2, 1954 |
| 2,724,485 | Reading | Nov. 22, 1955 |
| 2,726,061 | Schieser et al. | Dec. 6, 1955 |
| 2,732,164 | Legrow et al. | Jan. 24, 1956 |
| 2,758,703 | Hampf | Aug. 14, 1956 |
| 2,828,935 | Ziegler et al. | Apr. 1, 1958 |
| 2,889,131 | Crabb | June 2, 1959 |

FOREIGN PATENTS

| | | |
|---|---|---|
| 546,206 | Great Britain | July 2, 1942 |